US012694013B2

(12) United States Patent
Levy et al.

(10) Patent No.: US 12,694,013 B2
(45) Date of Patent: Jul. 28, 2026

(54) SYSTEMS AND METHODS FOR DETECTING HIGH IMPACT NON-INFORMATIVE FEATURES

(71) Applicant: PAYPAL, INC., San Jose, CA (US)

(72) Inventors: Simcha Avichai Levy, Tel Aviv (IL); Alon Dourban, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/960,974

(22) Filed: Nov. 26, 2024

(65) Prior Publication Data

US 2026/0147746 A1 May 28, 2026

(51) Int. Cl.
*G06F 7/00* (2006.01)
*G06F 16/23* (2019.01)
*G06F 16/28* (2019.01)

(52) U.S. Cl.
CPC ........ *G06F 16/2365* (2019.01); *G06F 16/285* (2019.01)

(58) Field of Classification Search
CPC ........................... G06F 16/2365; G06F 16/285
USPC .................................................. 707/600–899
See application file for complete search history.

(56) References Cited

U.S. PATENT DOCUMENTS 12,190,877 B1 * 1/2025 Barber .................... G10L 15/22

OTHER PUBLICATIONS

International Search Report and Written Opinion of application No. PCT/US2025/056329, dated Jan. 23, 2026, pp.

* cited by examiner

*Primary Examiner* — Isaac M Woo
(74) *Attorney, Agent, or Firm* — Greenberg Traurig, LLP

(57) ABSTRACT

System and methods for determining high-impact, non-informative features in datasets can include obtaining a first dataset including a first set of features and first set of tags, determining a second dataset including a second set of features and the first set of tags, the second set of features transformed from the first set of features, and each of the second set of features including a binary value, predicting, by a model, a third dataset including a third set of features and second set of tags based on the second dataset, comparing the third dataset to the second dataset to determine a correlation therebetween, based on the comparison, filtering at least one feature having missing feature values from the first dataset, and determining a training dataset with the remaining features in the first dataset, wherein the model being trained using the training dataset improves the outcome prediction accuracy of the model.

20 Claims, 10 Drawing Sheets

200

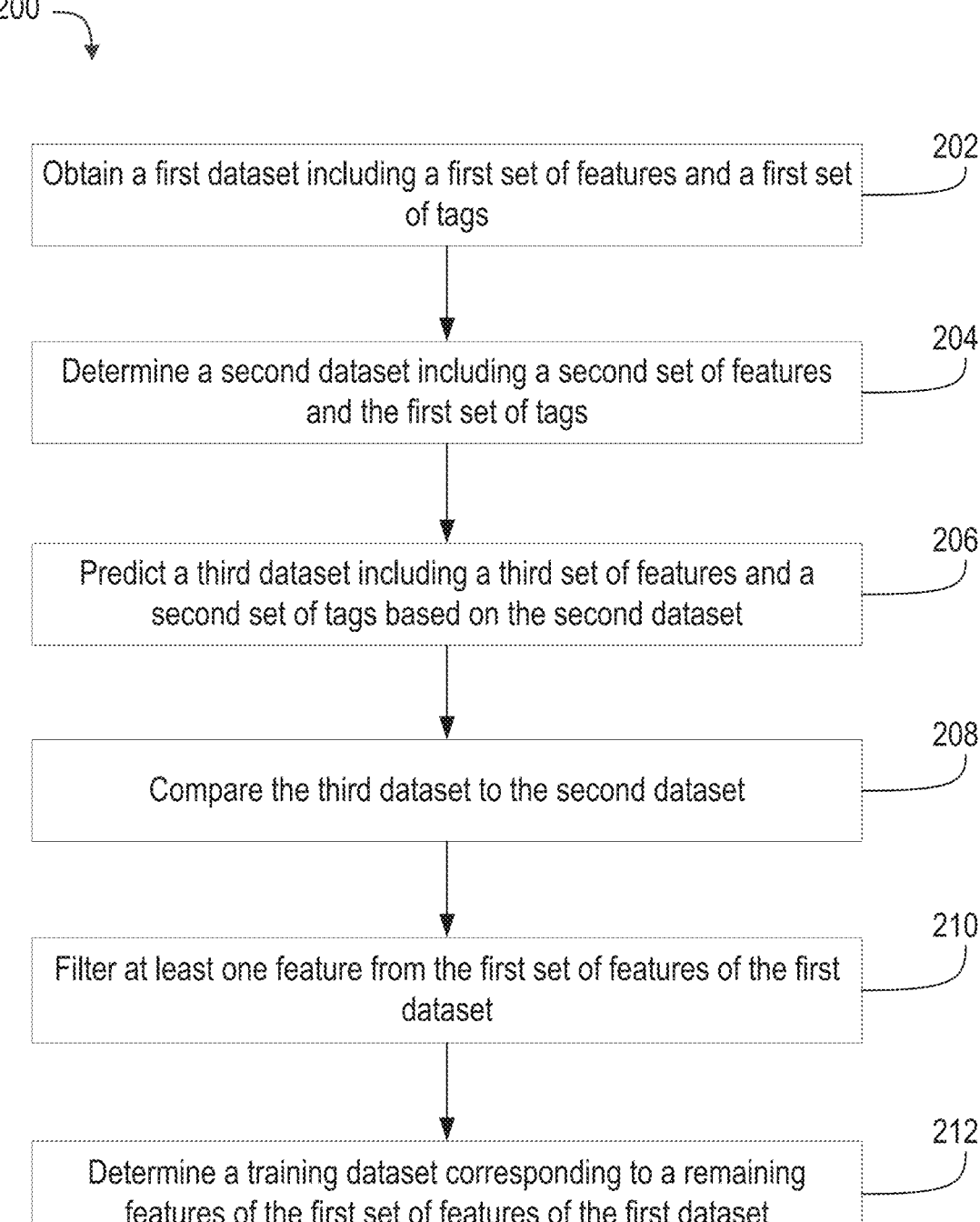

Obtain a first dataset including a first set of features and a first set of tags — 202

Determine a second dataset including a second set of features and the first set of tags — 204

Predict a third dataset including a third set of features and a second set of tags based on the second dataset — 206

Compare the third dataset to the second dataset — 208

Filter at least one feature from the first set of features of the first dataset — 210

Determine a training dataset corresponding to a remaining features of the first set of features of the first dataset — 212

Figure 4:
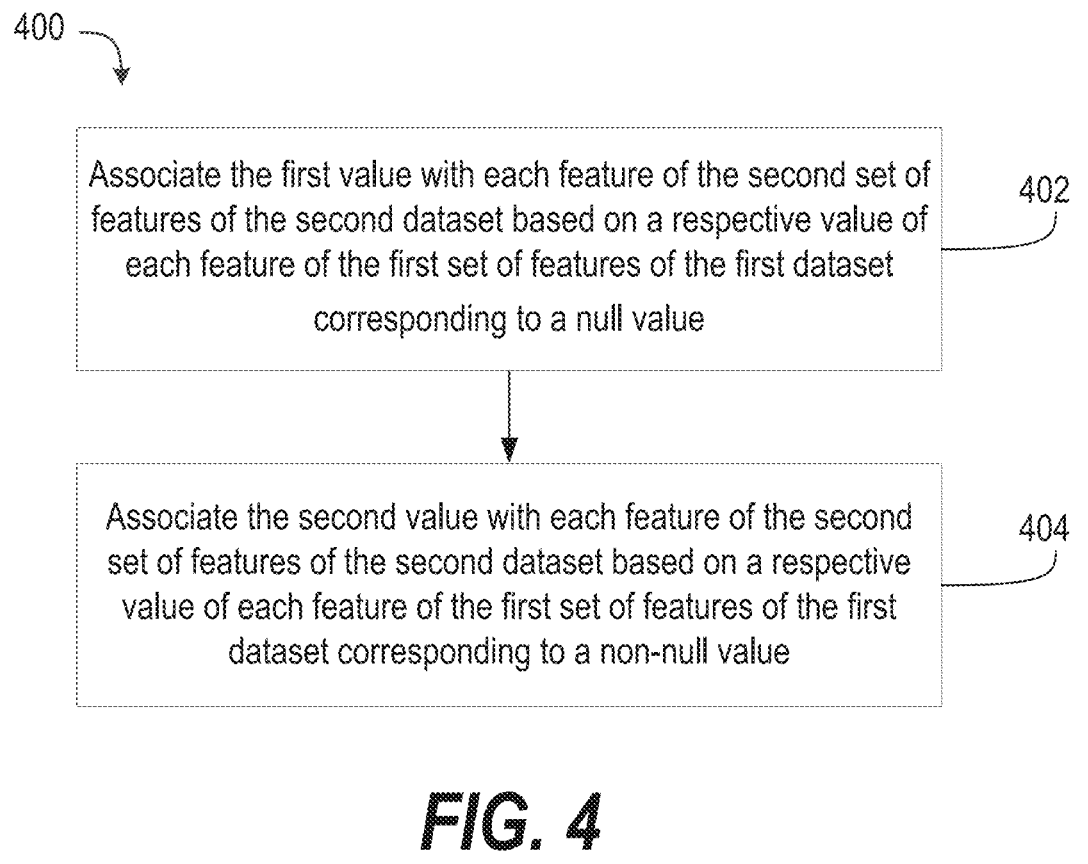

Associate the first value with each feature of the second set of features of the second dataset based on a respective value of each feature of the first set of features of the first dataset corresponding to a null value

402

Associate the second value with each feature of the second set of features of the second dataset based on a respective value of each feature of the first set of features of the first dataset corresponding to a non-null value

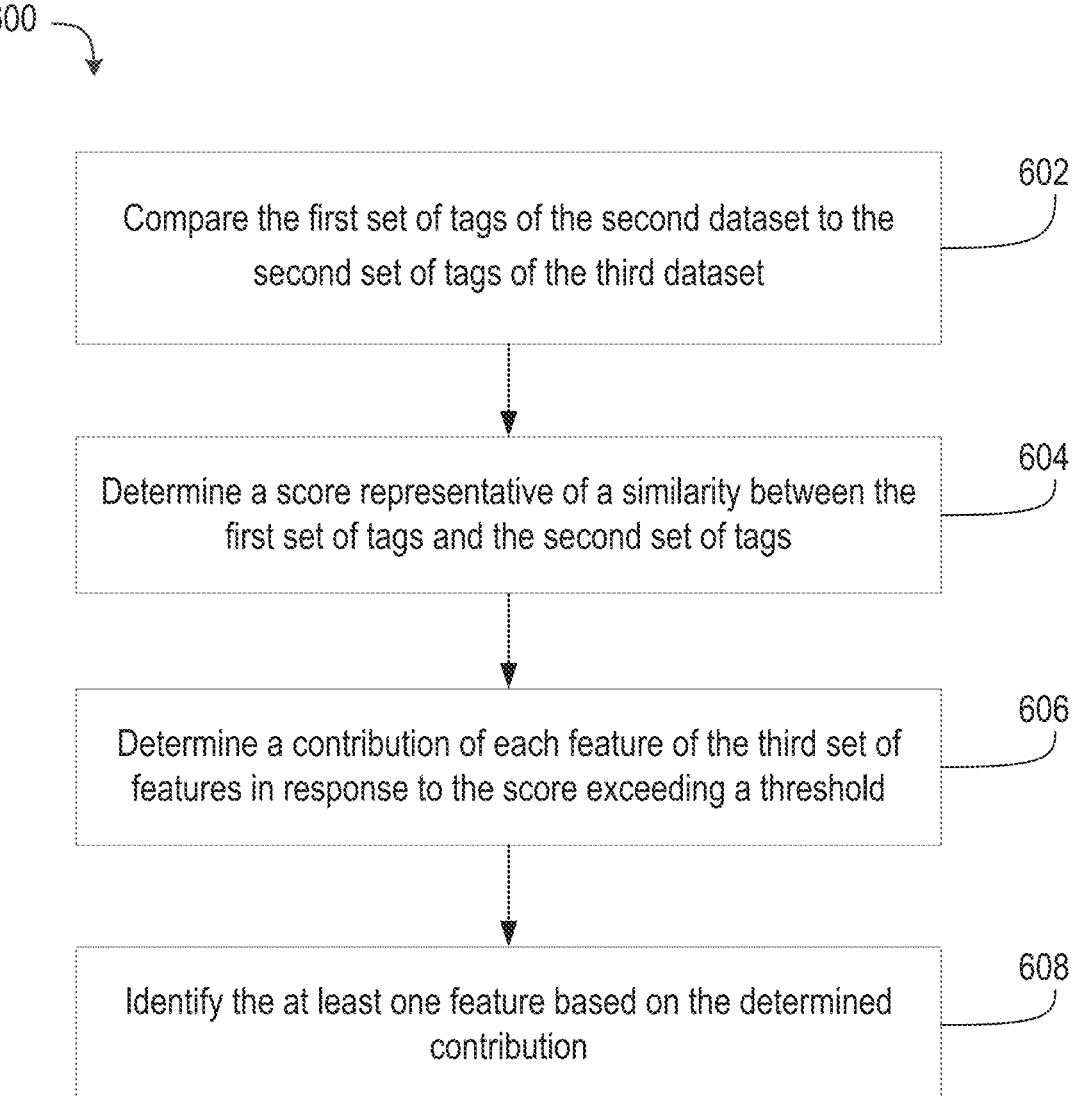

602

Compare the first set of tags of the second dataset to the second set of tags of the third dataset

604

Determine a score representative of a similarity between the first set of tags and the second set of tags

606

Determine a contribution of each feature of the third set of features in response to the score exceeding a threshold

608

Identify the at least one feature based on the determined contribution

Associate a value to each feature of the second set of features of the second dataset — 802

Compare each feature of the second set of features of the second dataset to an average — 804

Rank the third set of features of the third dataset based on the determined contribution — 806

SYSTEMS AND METHODS FOR DETECTING HIGH IMPACT NON-INFORMATIVE FEATURES

FIELD

The present disclosure relates to the field of data analytics. More particularly, to systems and methods for detecting high impact non-informative features.

BACKGROUND

Various data analytic techniques are commonly utilized in a computing environment to predict insights based on data. One or more actions can then be taken based on the insights. For example, the one or more actions can be to further a business objective of an entity associated with the data. The data analytic techniques can include applying the data to a trained model to make outcome predictions based on the features of the data. The data can oftentimes be incomplete and can therefore include one or more features that may be missing one or more values (e.g., null). Accordingly, whether the model can make a prediction or whether the model can make an accurate outcome prediction based on a given dataset may be dependent on the quality of the data and/or the extent to which the features are missing values in the given dataset.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 2 is a flow diagram of an example method for detecting the high-impact, non-informative features in a dataset, according to some embodiments.

FIG. 4 is a flow diagram of an example method for transforming datasets, according to some embodiments.

FIG. 6 is a flow diagram of an example of a method for comparing datasets to identify non-informative features, according to some embodiments.

DETAILED DESCRIPTION

Figure 1:
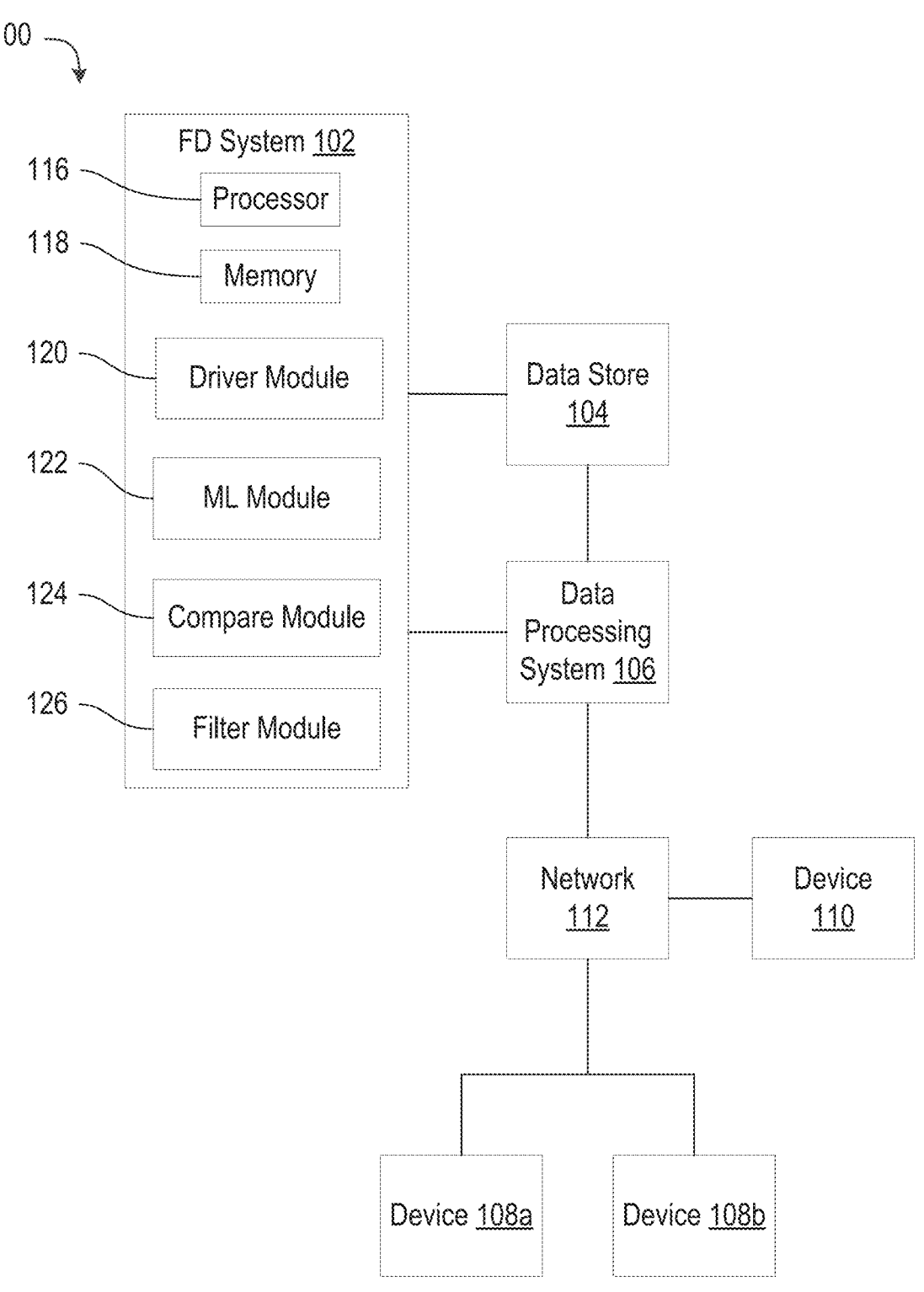
FIG. 1 is a block diagram of an example system for detecting high-impact, non-informative features in datasets, according to some embodiments.

Various data analytics techniques can be applied to data in a computing environment or computing device using one or more models. A model can be trained, for example, to output an outcome prediction (e.g., decision) based on an input dataset. Accordingly, the data analytics techniques can include training the model to apply one or more model algorithms or model techniques to data in the model and output a prediction outcome. The input dataset can include, for example, a plurality of data points, and each data point can include a value associated with a corresponding feature and the input dataset can include one or more features.

Ideally, the dataset is a complete dataset and does not include any missing value. Oftentimes, however, one or more features in the dataset can have one or more missing values and can be represented by, for example, a null value. That is, the dataset can include null values for any missing data. Certain challenges can arise from applying a dataset having features with missing values to a model. Although the model can sometimes still make an accurate outcome prediction based on the non-null values in the dataset, the missing values in the dataset can also cause the model to make inaccurate predictions or can bias the outcome predictions of the model. That is, the outcome prediction of the model can be based on the model identifying patterns from the missing values (e.g., null values) in the data rather than on the actual values (e.g., non-null values) in the dataset. This oftentimes can arise because the model algorithm can become sensitive to the patterns of missing data, which can inadvertently carry predictive signals. For instance, a model may learn that the absence of values at a given feature is correlated with a specific outcome so as to become trained to focus on the null values rather than on the feature's other substantive information (e.g., non-null values). This can lead to overfitting and poor generalization as the model relies on data artifacts that may not be present or relevant in real-world scenarios.

Various embodiments of the present disclosure relate to systems, methods, and computer-program products related to detecting non-informative features in datasets that may impact a model's outcome prediction and filtering these features from the dataset. Accordingly, when the filtered dataset is applied to a model, the outcome prediction is based on the substantive features and not based on the missing data. Additionally, the filtered dataset can be utilized to generate a training dataset and the model at the domain or one or more other models at one or more other domains can be trained using the training dataset to fine tune the model and improve the model accuracy.

According to some embodiments, detecting the non-informative features in a dataset can include, but is not limited to, obtaining a first dataset including a first set of features and a first set of data tags, encoding the features of the first dataset to generate a second dataset including a second set of features and associating the first set of tags with the second dataset, and training a model using the second dataset, and the model can be configured to output a third dataset corresponding to a prediction of the first set of data tags, the prediction being based on the second set of features. In some embodiments, the first dataset can be, for example, suspected of having a high correlation between a target population and a given null feature. In some embodiments, the second set of features can be transformed from the first set of features. That is, in some embodiments, the values of each feature of the first dataset can be encoded into a binary value using one or more algorithms based on whether the value is a null value or a non-null value, and the values of each corresponding feature of the second dataset can be encoded with the binary value. In some embodiments, a computing environment or computing system can be configured to perform one or more operations including detecting the non-informative features in datasets and/or training the models using the filtered dataset, among other operations in accordance with the present disclosure.

According to some embodiments, the third dataset can be compared to the original tags to determine a correlation therebetween. In response to determining there is a correlation between the outcome prediction by the model and the original tags indicative of the model learning patterns based on non-informative features, one or more explainability steps, operations, processes, etc., can be performed to identify the features that contribute to the prediction of the original tags in the model (and the first dataset). In addition, one or more of these features identified as having an impact on the outcome prediction of the original tags by the model can be filtered from the first set of features of the first dataset.

The various embodiments of the disclosure also provides one or more improvements and/or benefits to challenges associated with the missing data. The remaining features can be utilized to generate a dataset that does not include these non-informative, high-impact features. In some embodiments, the remaining features can be utilized to generate a training dataset for training a model to improve the model accuracy and to mitigate biased outcomes, overgeneralization, and poor overfitting of the model. In this regard, removal of the high-impact, non-informative features from the dataset can lead to more robust models across a broad range of domains and/or applications such as, for example, risk assessment, healthcare, user behavior predictions, product recommendations, electronic transactions, user validation or authentication, advertisements, logistics, transportation, etc. In addition, training a model using the training dataset of the present disclosure can enable the model to focus on relevant features, thereby improving the fairness, accuracy, and overall effectiveness of the model in a wide range of applications. In addition, the training methodologies of the present disclosure can also simplify the model, reduce computational costs, reduce human validations needs, among other improvements.

In an example, the removal of the high-impact, non-informative features from the dataset used to train a model can mitigate bias in risk assessment applications including loan approvals, insurance underwriting, etc. In another example, removing high-impact, non-informative features from the dataset used to train the model can provide benefits in healthcare-related applications such as where irrelevant diagnostic factors can be removed from disease prediction models, thereby improving diagnostic accuracy. In another example, removing high-impact, non-informative features from datasets can enable a model trained on the dataset to provide recommendations that target users based on genuine user preferences rather than using potentially biased demographics data. In one example, removing the high-impact, non-informative features from the dataset used to train the model can enable targeting users with certain advertisements tailored based on genuine user preferences rather than potentially biased demographics data.

In other known approaches, overcoming these challenges has generally necessitated additional steps to account for the missing data. One known approach for overcoming the challenges associated with the missing data can include calculating a mean, median, or mode of the features and employing one or more model techniques like k-nearest neighbors (KNN) or regression imputation to create additional features in the dataset indicating whether the original value is missing to enable the model to learn whether the presence of missing data itself is informative. However, these other approaches do not address the null-state correlations that the model can learn from the missing values themselves in the dataset. Another known approach for overcoming the challenges associated with the missing data can also include using regularization techniques (e.g., L1 or L2 regularization) to penalize overly complex models, and continuously evaluating the model's performance using cross-validation and other metrics to ensure that the model generalizes well to unseen data. However, this approach can necessitate increased human intervention and can still lead to the model relying on null-state correlations based on the missing values in the data. In addition, the absence of the data can be concentrated more to target variables, which can lead to bias in the final model, which can be difficult to detect in the model.

Another known approach for overcoming the challenges associated with the missing data can include by imputation or designing the model to be invariant to the missing feature values. However, imputing the data may not be sufficient since the model can still rely on the absence of the feature values by relying on the imputed value rather than what the missing value represents. In addition, designing the model to be invariant to the missing feature values can also lead to problems later on in production as the features having missing values can be assigned values later in the real world after the release of the model, which would not be considered by the model. In this regard, it can be common that the distribution of missing values is not stable over time and can be affected by external reasons such as, for example, coverage change of data, different engineering encoding, among other reasons. For example, different encoding standards can classify values as Nan, " ", Null, "Null", 0, etc. Hence, this non-stable behavior can directly negatively impact the performance of the model.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Referring now to the drawings, wherein like reference numerals refer to the same or similar features in the various views, FIG. 1 is a block diagram of an example system 100 for detecting features including high-impact, non-informative features in datasets, according to some embodiments.

The system 100 may include a feature detection (FD) system 102, a data store 104, a data processing system 106, a plurality of computing devices 108 (two such user devices 108*a*, 108*b* are shown), and one or more computing devices 128 (one such computing device 128 is shown). The data store 104 can include historical data. In some embodiments, the data store 104 can have stored thereon prior transaction data such as, for example, electronic transactions performed using data processing system 106. The computing devices 108 can be user computing devices of system 100. The computing devices 128 can be merchant computing devices 128. The computing devices 108 and computing device 128 can be in electronic communication with the data processing system 106 and with each other over a network 112. For example, the one or more computing devices 128 can perform electronic transactions with the computing devices 108 through data processing system 106 on network 112. The FD detection system 102, data store 104, and data processing system 106 can also all be in electronic communication with each other via the network 112 and/or another network.

Users may initiate transaction, review transactions, complete transactions, input queries, etc. on computing devices 108 through the data processing system 106. Accordingly, in some embodiments, the data processing system 106 can receive, for example, an instruction to initiate a transaction, an instruction to accept or complete a transaction, an instruction to review one or more transactions, an instruction to retract a transaction, etc., from computing devices 108, and may respond by performing or facilitating the requested user action. In other embodiments, the data processing system 106 can receive, for example, an instruction to process a dataset and to provide an outcome prediction based on the dataset in accordance with the present disclosure, or some other processing operation from computing devices 108, and the FD detection system 102 can perform the one or more operations. Accordingly, user activity as discussed herein can include instructions directed through the data processing system 106, in some embodiments, and/or user activity on one or more platforms, networks, etc. Such activity may include, for example, a computing transaction such as a file creation, a revision to a file, an electronic communication, user authentication, a processing operation query, a financial transaction (or component thereof), a real-estate transaction (or component thereof), a service request, or any other electronic transaction. Additionally, or alternatively, user activity according to the present disclosure may be or may include an event associated with a user, such as a user navigation to a webpage, a user search request, etc.

The transaction processing system 106 may be associated with a particular electronic user interface and/or platform through which a user performs electronic transactions. The electronic user interface may be embodied in a website, mobile application, etc. According, the data processing system 106 may be associated with or wholly or partially embodied in one or more servers, which server(s) may host the interface, and through which the computing devices 108 may access the user interface.

The computing devices 108 may be respectively associated with different user accounts. That is, computing device 108a may be associated with a first user account, and computing device 108b may be associated with a second user account. Where user computing devices are discussed herein, it may be assumed that different devices are associated with different user accounts for convenience of description, though of course a single user account may be accessed from multiple devices in practical use.

The FD detection system 102 may include a processor 116 and a non-transitory, computer-readable memory 118 (e.g., media device) that contains instructions that, when executed by the processor, cause the FD detection system 102 to perform one or more of the steps, processes, methods, operations, etc. described herein with respect to the FD detection system 102. The FD detection system 102 can include one or more functional modules embodied in the memory 118. The functional modules can include a driver module 120, a machine learning (ML) module 122, a compare module 124, and a filter module 126.

The instant disclosure refers to data including, but not limited to, account data, user data, device data, behavioral data, meta data, sequence data, electronic transaction data, diagnostic data, other data associated with system 100 and/or network 112, or any combination thereof. Such accounts can be accounts common to a particular service provider, a particular network, a particular entity, a particular electronic activity processor, a particular merchant, a particular user, etc. For example, the accounts can be accounts with the data processing system 106, and the users associated with computing devices 108 can be legitimate users associated with those accounts. The electronic transactions and other electronic activity can be transactions processed by, or other activity in or through, the data processing system 106, and/or transactions and activity outside of the data processing system 106. Although this disclosure refers to electronic transactions as context for the novel methods and systems, it should be understood that such methods and systems may be applied to or in the context of a wide variety of computing actions, some of which may not be considered transactions. For example, where past transactions are considered herein, past computing actions may more broadly be considered. Similarly, where present transactions are responded to herein, present computing actions may more broadly be responded to. In an example, the data processing system 106 can be used to chart and store patient diagnostic and treatment data.

The FD detection system 102 can include driver module 120. The driver module 120 can obtain a first dataset that includes a plurality of data points corresponding to a set of data objects. The first dataset can include a first set of features, and each feature of the first set of features can include one or more feature values associated therewith. Each feature value at a given feature can be associated with a given data point, and can be representative of, for example, a specific attribute for the given data point. In some embodiments, the first set of features can include a categorical feature or a numerical feature. In some embodiments, at least one feature of the first set of features can be a categorical feature (e.g., categorical variable), and each of the feature values associated therewith can have a qualitative feature value. In some embodiments, at least one feature of the first set of features can be a quantitative feature (e.g., quantitative variable), and each of the feature values associated therewith can have a quantitative feature value (e.g., number value). In some embodiments, in the first dataset, each feature value can be represented by a quantitative feature value or a quantitative feature value. In an example, a categorical feature can be represented by text data that describes a qualitative attribute of the data. In another example, a categorical feature can be represented by a vector value that describes the qualitative attribute of the data.

According to some embodiments, a dataset can include one or more data tags. Each tag (e.g., data tag) can correspond to a label that can, for example, describe the data, identify the data, classify the data, protect the data, or any combination thereof. In some embodiments, each tag can correspond to a label that can be representative of, for example, metadata that provides context to the data. The data tags can be used to label a dataset (e.g., first dataset or second dataset) and the respective features (e.g., first set of features or second set of features) in the dataset to enable a model trained using the dataset to learn patterns within the data based on the labeled target so that the model can make outcome predictions on new data. In some embodiments, a dataset can include a set of features and a set of data tags, and a model trained using the set of features of the dataset (e.g., second set of features) can be configured to output an outcome prediction of the original set of data tags in the dataset.

The first dataset can include a first set of tags. The first set of tags can correspond to labels of attributes of the features. In some embodiments, the first set of tags can correspond to labels of target attributes of the first set of features of the first dataset. Accordingly, the first set of features of the first dataset can be encoded into a second set of features, a model for predicting outcomes based on an input can be trained using the second set of features, and the model can be configured to generate an output corresponding to a prediction of the first set of tags based on the encoded (e.g., transformed) second set of features, as will be further described herein.

The driver module 120 can be configured to determine a second dataset including a second set of features. The second dataset can correspond to a driver set, and each of the second set of features can be encoded (e.g., transformed) from a corresponding feature of the first set of features of the first dataset. That is, each of the second set of features of the second dataset can include one or more feature values and each feature value of each data point in the second dataset can have an encoded value representative of a corresponding feature value for a corresponding features in the first dataset.

In the second dataset, each feature value can have a value from a binary value pair. That is, each feature value in the second dataset can have one of a first value or a second value of the binary value pair based on a corresponding feature value of the first dataset. Whether a data point in the second dataset is encoded with the first value or the second value can be dependent on whether the corresponding feature value in the first dataset is one of a null value or a non-null value. Accordingly, for the second set of features in the second dataset, the driver module 120 can encode the data point with the first value based on the corresponding feature value (e.g., corresponding data point) in the first dataset being a null value (e.g., missing value) or the driver module 120 can encode the data point with the second value based on the corresponding feature value (e.g., corresponding data point) in the first dataset being a non-null value (e.g., substantive value). In some embodiments, the first value of the binary value pair can have a value of 0 representative of a null value. In some embodiments, the second value of the binary value pair can have a value of 1 representative of a non-null value. In this regard, the second set of features of the second dataset can be an encoded dummy driver set generated by the driver module 120, and the second set of features can include one or more first values (e.g., values of 0) representative of null values in the first dataset and can include one or more second values (e.g., values of 1) representative of non-null values in the first dataset. It is to be appreciated that the second set of features is not intended to be limited to binary values of 0, 1, and the driver module 120 can encode the second set of features with any of a plurality of other binary value pairs that can be representative of the null values and non-null values in the first set of features of the first dataset.

The second dataset can also include the first set of tags. In some embodiments, the driver module 120 can combine the first set of tags and the second set of features to generate the second dataset. In some embodiments, the driver module 120 can be configured to extract the first set of tags from the first dataset, and the driver module 120 can associate the extracted tags with the second set of features to generate the second dataset.

The second dataset can be applied to a model of FD detection system 102 to enable identification of non-informative features in the model that can be contributing to the outcome prediction. The model of FD detection system 102 can be trained using the second set of features of the second dataset to drive the trained model towards a prediction of the first set of tags. The trained model can output a third dataset including a second set of tags representative of the model's prediction of the original tags based on the dummy driver set corresponding to the second set of features.

The FD detection system 102 can include a ML module 122. The ML module 122 can include one or more models. The one or more models can be trained using a training dataset to predict an outcome based on the features of the training dataset. The training dataset can include one or more data tags that can provide context to the underlying feature data so as to teach the model the target responses it needs to predict for a given input. Accordingly, the model can utilize the data tags to identify and/or learn patterns based on the data to enable predicting outcomes on new data.

According to some embodiments of the present disclosure, the ML module 122 can include a model configured to predict an outcome based on an input. The model of ML module 122 can be trained using a training dataset to predict the outcome corresponding to the target population. In some embodiments, the model of ML module 122 can be trained using the second dataset and the model can be configured to output the third dataset as the predicted outcome. In some embodiments, the model of ML module 122 can be trained on the second set of features of the second dataset, and the model can generate the third dataset as the predicted outcome based on the second set of features. In some embodiments, the model of ML module 122 can be trained using the binary value pairs that represents each feature value of the second set of features in the second dataset, and the model can output the third dataset as the prediction of the first set of tags. In some embodiments, the third dataset includes a second set of tags. In some embodiments, the third dataset includes a third set of features and a second set of tags. In some embodiments, the third set of features can correspond to features of the model. In some embodiments, the third set of features can correspond to features of the model identified as contributing to the outcome prediction. In some embodiments, the third set of features can correspond to features of the model identified as contributing to the outcome prediction, and the features can be ranked according to their contribution in the model of ML module 122.

According to some embodiments, the model of ML module 122 can be an explainable model. That is, after the model outputs the predicted outcome, and in response to a determination that the predicted outcome has predictive value that is not random correlation based on a comparison between the second dataset (e.g., input dataset) and the third dataset (e.g., output dataset), the model can be configured to perform one or more steps, operations, processes, etc., to explain each features contribution to the final prediction in the model.

In addition, the model of ML module 122 can be configured to leverage the one or more explainability steps to identify non-informative features in the model (and in the first dataset), according to some embodiments. In some embodiments, the model of ML module 122 can be configured to identify the non-informative features with a positive impact in the model (and in the first dataset). In this regard, the one or more explainability steps can be utilized by the model of ML module 122 or by the one or more other functional modules of the FD detection system 102 to evaluate each respective features contribution to the final outcome. In some embodiments, a feature's coverage in the model can be indicative of the feature's contribution in the final prediction and can be utilized to identify the feature as a non-informative feature in the model (and the first dataset) with a high impact on the outcome prediction.

Accordingly, as the non-informative features identified in the model of ML module 122 correspond to non-informative features in the first dataset, the outcome predictions of other models trained using the first dataset can be impacted by these non-informative features and thereby decrease the accuracy of these other models and can contribute to inaccurate predictions made by these other models. For example, a model for predicting whether an electronic transaction that is performed at data processing system 106 is suspected of being malicious activity can be trained on a dataset that includes one or more non-informative features, and the dataset can cause the model accuracy to decrease due to the models reliance on non-informative features in making the prediction. The other models can be associated with, for example, ML module 122, one or more other functional modules of FD detection system 102, data processing system 106, computing devices 108, computing devices 110, or the other models can be associated with one or more other computing devices associated with system 100, in communicable connection with FD detection system 102 and/or data processing system 106 via network 112, or can be on another network external to system 100.

It is to be appreciated that although the features determined to have the highest coverage in the model can be indicative of non-informative features with a high impact in the model (and the first dataset), there can be one or more other features in the model that is affecting the outcome prediction by the model but that does not have the highest coverage in the model. That is, it is to be appreciated that there may not necessarily be a direct correlation between a feature's coverage in the model of ML module 122 and the feature's impact in the model (and the first dataset). Accordingly, the explainability steps can be utilized in FD detection system 102 to identify not only the features with the highest coverage in the model (and the first dataset), but can be utilized to these one or more other features that may not have the highest coverage in the model but yet contributes to the outcome prediction and causes a decrease in the model's accuracy. As used herein, the term "coverage" refers to the extent that a model utilizes a given feature in the dataset and can be indicative of how information from the given feature is incorporated into the model.

According to some embodiments, the ML module 122 can include a classification model. The second set of features of the second dataset can be applied to the classification model as input to train the classification model, and the classification model can output the third dataset as the prediction of the first set of data tags (e.g., target population). The prediction of the classification model can be based on identification of patterns within the second set of features by the classification model. The classification model can be trained so as to adjust one or more model parameters based on the second set of features so as to minimize the prediction error on the training dataset. In an example, the model parameters can be updated by adjusting weights of the model.

The ML module 122 can include any of a plurality of classification models suitable for predicting outcomes based on an input dataset (e.g., training dataset). In some embodiments, the ML module 122 can include a Naïve Bayes classification model. In some embodiments, the ML module 122 can include a support vector machine (SVM) classification model. In some embodiments, the ML module 122 can include a decision tree classification model. In some embodiments, the ML module 122 can include a random forest classification model. In some embodiments, the ML module 122 can include one or more other classification models capable of predicting the data tags based on a set of features having one or more binary values as feature values, and in accordance with the present disclosure.

In addition, the classification model in the ML module 122 can utilize one or more classification algorithms suitable for predicting the third dataset. In some embodiments, the classification algorithm can include decision tree algorithms. In some embodiments, the classification algorithm can include support vector machines algorithms. In some embodiments, the classification algorithm can include k-nearest neighbors. In some embodiments, the classification algorithm can include neural network based algorithms. In some embodiments, the classification algorithm can include one or more other classification algorithms capable of utilized in a model for predicting the data tags based on a set of features having one or more binary values as feature values, and in accordance with the present disclosure.

According to some embodiments, the ML module 122 can include a regression model. The second set of features of the second dataset can be applied to the regression model as input to train the regression model, and the regression model can output the third dataset as the prediction of the first set of data tags (e.g., target population). The regression model can be configured to apply one or more statistical techniques to the second set of features to learn the relationship between features and predict an outcome by adjusting its internal parameters to minimize a chose "loss function." The regression model can apply one or more optimization algorithms such as, for example, gradient descent optimization to update the model parameters. In an example, the model parameters can be updated by adjusting weight values associated with the parameters. In an example, the model parameters can be updated by adjusting biases of the model. In some embodiments, the regression model can determine the relationship between a dependent variable and one or more independent variables to identify and measure the impact each variable in the model has on each other.

The ML module 122 can include any of a plurality of regression models suitable for predicting outcomes based on an input dataset (e.g., training dataset). In some embodiments, the ML module 122 can include a linear regression model. In some embodiments, the ML module 122 can include a logistic regression model. In some embodiments, the ML module 122 can include a decision tree regression model. In some embodiments, the ML module 122 can include a neural network regression model. In some embodiments, the ML module 122 can include a lasso regression model. In some embodiments, the ML module 122 can include a polynomial regression model. In some embodiments, the ML module 122 can include a ridge regression model. In some embodiments, the ML module 122 can include a support vector regression model. In some embodiments, the ML module 122 can include a stepwise regression model. In some embodiments, the ML module 122 can include a Bayesian linear regression. In some embodiments, the ML module 122 can include a random forest regression model. In some embodiments, the ML module 122 can include a Poisson regression model.

The FD detection system 102 can include a compare module 124. The compare module 124 can be configured to compare different datasets. Based on the comparison, the compare module 124 can determine if there is some correlation between the datasets that can be indicative of non-informative features in the model contributing to the outcome prediction. In some embodiments, the compare module 124 can be configured to determine that there is a correlation between datasets based on a defined threshold.

The compare module 124 can be configured to utilize one or more comparative methodologies to compare the second dataset input into the model and the third dataset output by the model to determine the correlation therebetween. In some embodiments, the compare module 124 can be configured to utilize one or more statistical methodologies to compare the second dataset input into the model and the third dataset output by the model to determine the correlation therebetween. In some embodiments, the compare module 124 can be configured to determine the correlation between second dataset and the third dataset based on the correlation between the first set of tags and the second set of tags.

To determine the correlation between the second dataset and the third dataset, the compare module 124 can be configured to determine a correlation score. The correlation score can be representative of the similarity between the second dataset and the third dataset. In some embodiments, the correlation score can be representative of the similarity between the first set of tags and the second set of tags.

The compare module 124 can compare the correlation score to a threshold to determine if there is a correlation between the datasets. In some embodiments, the compare module 124 can determine there is a correlation between the datasets based on the correlation score exceeding the threshold. In some embodiments, the compare module 124 can determine that there is not a correlation between the datasets based on the correlation score being below the threshold. Accordingly, the correlation score can be representative of the similarity between one or more tags of the second dataset and one or more corresponding tags of the third dataset. In some embodiments, the correlation score can be a correlation coefficient calculated by the compare module 124. In an example, the correlation score can be determined using a Pearson's correlation coefficient.

The compare module 124 can generate the correlation score using any of a plurality of other methods. In some embodiments, the compare module 124 can determine the correlation using a correlation matrix including the correlation scores between the first set of tags and the second set of tags. In some embodiments, the compare module 124 can utilize a model from ML module 122 to determine the correlation between the second dataset and the third dataset. In an example, the model can be a regression model. In an example, the model can be a linear regression model. In some embodiments, the correlation score can include a plurality of values representative of the similarity between, for example, each tag in the first set of tags and corresponding tags in the second set of tags.

The compare module 124 can determine there is a correlation between the datasets based on comparing the correlation score (e.g., correlation coefficient) to a threshold. In some embodiments, the threshold can be a defined threshold value. In some embodiments, the threshold can be a defined threshold range. In some embodiments, the threshold can be a defined range limit based on the correlation score. In some embodiments, the compare module 124 can calculate an absolute value of the correlation score, and the threshold can be a limit range this is defined based on one or more factors such as, for example, field of study, data size, confidence level, etc. For example, the threshold can be from 0.4 to 0.69, and the compare module 124 can determine there is a correlation between the first set of tags and the second set of tags that is not random based on the calculated correlation score being within the threshold.

The FD detection system 102 can include a filter module 126. The filter module 126 can be configured to perform one or more steps (e.g., explainability steps) to identify non-informative features in the model based on their contribution to the outcome prediction from the model. In some embodiments, the model can output the third dataset, and the third dataset can include a third set of features. In some embodiments, in response to the compare module 124 and/or the FD detection system 102 determining there is a correlation between the first dataset and the second dataset, the filter module 126 can be configured to perform the one or more explainability steps to identify one or more non-informative features in the third dataset.

According to some embodiments, to determine the contribution, the filter module 126 can be configured to calculate a unique value for each individual feature in the model that is representative of the feature's contribution to the outcome prediction from the model. In some embodiments, the value for each individual feature can be a contribution score calculated by the filter module 126. Based on the value of each feature in the model, the filter module 126 can determine the contribution of each individual feature to the final outcome prediction of the model, determine the importance of each feature in the outcome prediction compared to other features in the dataset, and determine how the model relies on interactions between the features in outputting the prediction.

According to some embodiments, the filter module 126 can calculate a unique value for each data point in the model that is representative of the contribution of each data point in the outcome prediction from the model, and the filter module 126 can determine the value for each feature by calculating a mean value of the values of the data points associated with that feature. In some embodiments, the value of the data point and/or the value of the feature can include one or more attributes. In some embodiments, the one or more attributes can include the value of the data point. In some embodiments, the one or more attributes can include the value of the input. In some embodiments, the one or more attributes can include the target value.

Based on the respective contributions of each feature in the model to the outcome prediction, the filter module 126 can sort and/or rank the one or more features of the third dataset to identify the features that have the highest impact in the outcome prediction. In this regard, the filter module 126 can rank each feature in the third set of features based on their respective contributions, as determined based on the unique value associated with each feature in the model.

In addition, the filter module 126 can be configured to filter one or more features from datasets based on the ranking. In some embodiments, the filter module 126 can identify one or more features to filter based on ranking the third set of features, and the filter module 126 can then filter one or more features from the first dataset that correspond to the one or more features in the third set of features that were identified by the filter module 126. Accordingly, the one or more features in the third set of features identified by the filter module 126 and the corresponding one or more features filtered from the first set of features of the first dataset is suspected non-informative feature(s) that have a high impact on the outcome prediction of the model. In some embodiments, the filter module 126 can identify the non-informative features in the first dataset according to the ranking of the third set of features and based on the unique value associated with each of the features.

According to some embodiments, the filter module 126 can filter out the non-informative features from the first dataset and can generate a training dataset from the remaining features in the first dataset. In some embodiments, the FD detection system 102, or one or more of the functional modules of the FD detection system 102, can utilize the training dataset to train a model to improve the accuracy of the outcome predictions of the model and to mitigate bias in the model by removing the non-informative features that may not be directly relevant to predicting the outcome of interest. In some embodiments, the model can be the model of ML module 122. In some embodiments, the model can be one or more other models associated with FD detection system 102, associated with data processing system 106, associated with system 100, associated with one or more other computing devices of system 100 or in communication connection with system 100 using network 112 or some other network. The model being trained using the training dataset corresponding to a remaining features of the first set of features improves the prediction accuracy of the model. For example, the model can be a classification model and the model training can improve the classification accuracy of the model. In some embodiments, the model of ML module 122 and/or of FD detection system 102 can be trained using the training dataset, and then applied across one or more different supervised learning domains to predict the outcome of interest using the model. In some embodiments, the training dataset can be applied to one or more models located at different supervised learning domains to predict the outcome of interest using the model.

Various embodiments herein can employ artificial-intelligence (AI) models, neural network models, deep learning neural network models, deep q-learning neural network models, and/or machine learning models in a system such as, for example, FD detection system 102, the models utilizing one or more algorithms and techniques to facilitate training the models from scratch, training the models using input data, training the models using reinforcement learning for continual learning, so as to enable the models to determine decisions as outcome predictions based on applying the input data to the models, other processes, or any combination thereof. Although the one or more embodiments are described in the present disclosure in the context of determining high-impact, non-informative features in datasets in the context of electronic transactions, it is to be appreciated that the various embodiments can be utilized in a networked system such as, for example, system 100 for any of a plurality of purposes including, but not limited to, fulfilling transactions, authentications, recommendations, managing threats including identifying suspicious or fraudulent transactions, learning user behavior, risk assessment, healthcare, advertising, transportation, context-based scenarios, preferences, etc. in order to facilitate the system 100 taking automated action with high degrees of confidence for the computing devices on the network 112. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or ML components herein such as discussed above in context of ML module 122, compare module 124, and/or filter module 126 and the other functional modules of FD detection system 102 in FIG. 1 can include artificial intelligence component(s) which can employ an artificial intelligence (AI) model, neural network or a neural network model, or ML or a ML model, that can learn to perform the above or below described functions (e.g., via training data and/or feedback data). In some embodiments, the FD detection system 102 can include a ML model configured to utilize natural language processing (NLP) to determine a context of a service call based on text data. In other embodiments, the FD detection system 102 can include a ML model configured to utilize one or more techniques to determine a context of a service call based on text data, image data, sequential data, other types of data, or any combination thereof. In some embodiments, the model can include, for example, a small language model, medium language model, large language model.

In some embodiments, the system 100 and/or the FD detection system 102 can include an ML module including an AI and/or ML model that can be trained (e.g., via supervised and/or unsupervised techniques) to perform one or more of the above or below-described functions using training data including various context conditions that correspond to various management operations. In one example, an AI and/or ML model can further learn (e.g., via supervised and/or unsupervised techniques) to perform the above or below-described functions using training data including feedback data, where such feedback data can be collected and/or stored (e.g., in memory 118 or data store 104) by filter module 126 or by an ML module 122 of FD detection system 102. In this example, such data can include the various instructions described above/below that can be input, for instance, to a system herein, over time in response to observed/stored context-based information.

AI/ML components herein can initiate an operation(s) associated with the one or more functional modules 120, 122, 124, 126, of the FD detection system 102 based on a defined level of confidence determined using information (e.g., training data). For example, based on learning to perform such functions described above using training data, performance information, and/or past performance information herein, an ML model herein can initiate an operation associated with providing decisions as output predictions based on the input data applied to the model including context data from the service request including, but not limited to, user data, account data, device data, historical data, inventory data, user behavior data, sequence data, other types of data at FD detection system 102 or data processing system 106, or any combination thereof. In another example, based on learning to perform such functions described above using training data or feedback data, and an ML model can be trained from scratch, trained using reinforcement learning, trained using continual learning, or trained using data based on the activity of the services at the domain.

In an embodiment, the ML model can perform a utility-based analysis that factors cost of initiating the above-described operations versus benefit. In this embodiment, an artificial intelligence component can use one or more additional context conditions to determine an appropriate distance threshold or context information, or to determine an update for a tuning model.

To facilitate the above-described functions, an ML model herein can perform classifications, correlations, inferences, and/or expressions associated with principles of artificial intelligence. For instance, an ML model can employ an automatic classification system and/or an automatic classification. In one example, the ML model can employ a probabilistic and/or statistical-based analysis (e.g., factoring into the analysis utilities and costs) to learn and/or generate inferences. The ML model can employ any suitable machine-learning based techniques, statistical-based techniques and/or probabilistic-based techniques. For example, the ML model can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML model can perform a set of machine-learning computations. For instance, the ML model can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In some embodiments, the ML model can utilize one or more clustering techniques including, but not limited to, density-based clustering, distribution-based clustering, centroid-based clustering, hierarchical based clustering, or any combinations thereof. In addition, the one or more models can apply one or more clustering algorithms including, but not limited to, k-means clustering algorithms, density-based clustering algorithms, Gaussian mixture model algorithms, balanced iterative reducing and clustering using hierarchies (BIRCH) algorithms, propagation clustering algorithms, mean-shift clustering algorithms, order point clustering, agglomerative hierarchy clustering algorithms, other algorithms, or any combinations thereof. For example, the model can apply the one or more centroid-based clustering models to determine clusters using k-means clustering algorithms.

FIG. 2 is a flow diagram of an example method 200 for detecting the high-impact, non-informative features in a dataset, according to some embodiments. The method 200, or one or more portions thereof, can be performed by the FD detection system 102 in conjunction with the data processing system 106, and thus can be computer-implemented.

Figure 3:
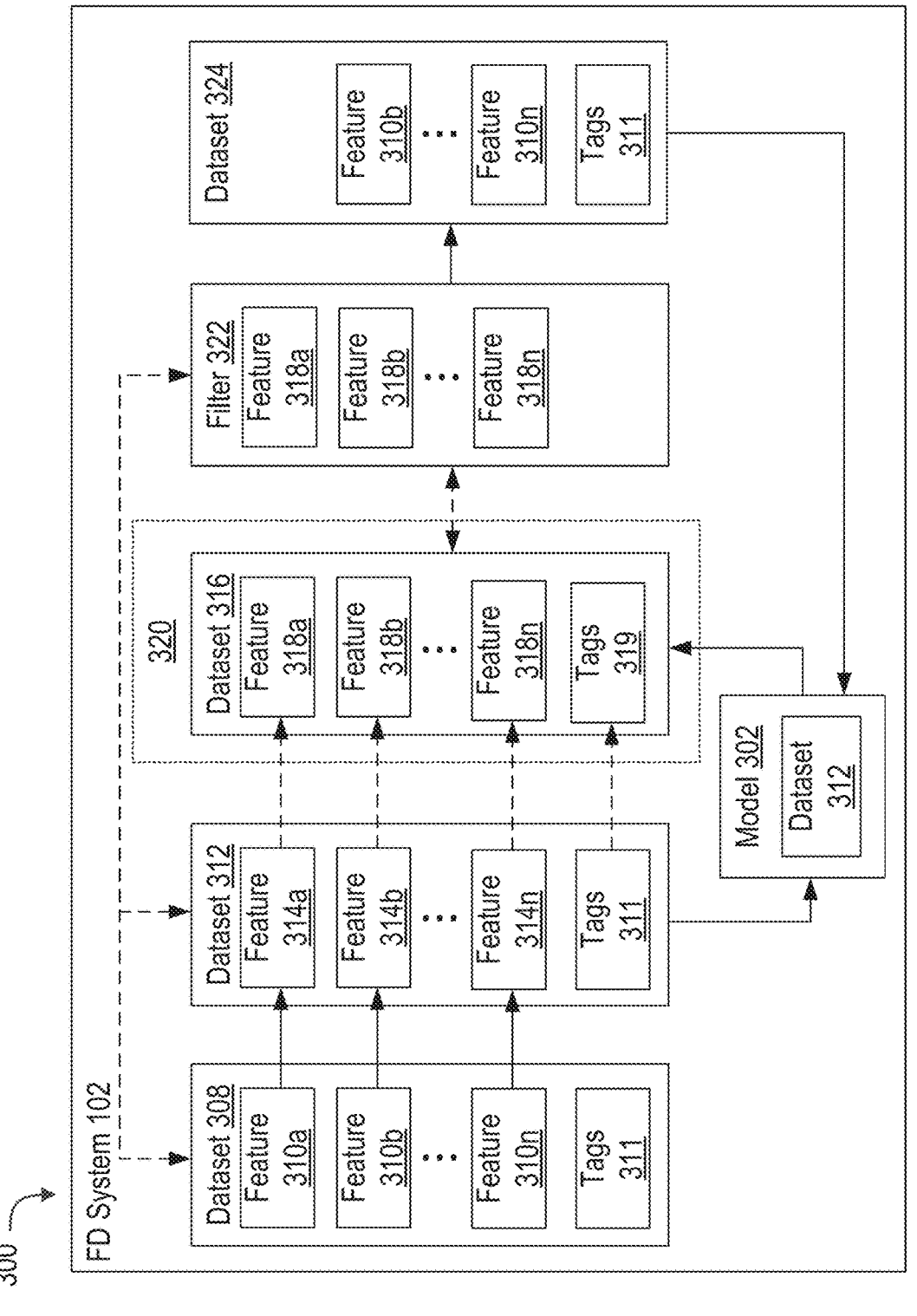
FIG. 3 is a block diagram of an example system for performing the method in FIG. 2, according to some embodiments.

FIG. 3 is a block diagram of an example system 300 for performing the method 200 in FIG. 2, according to some embodiments. The method 200 will be described in conjunction with the system 300.

At 202, the method 200 can include obtaining a first dataset including a first set of features and a first set of tags. In the first dataset, each feature of the first set of features can include one or more feature values associated therewith representative of an attribute of the data. Accordingly, the first dataset can include a plurality of data points that corresponds to, for example, a set of data objects, and each data object can include a set of feature values associated therewith from across the first set of features. Each feature of the first set of features can include one or more feature values associated therewith representative of an attribute of the data. The first dataset can include, for example, data from data processing system 106 or data store 104.

According to some embodiments, each feature value in the first dataset can include a null value or a non-null value. In an example, the null value can be represented by a "0." In an example, the non-null value can be a qualitative value. In an example, the non-null value can be a qualitative non-zero value and the null value can be represented by a "0" or some other value to indicate a null value. In FIG. 3, the first dataset is shown as dataset 308, the first set of features is shown as features 310a, 310b, through 310n, and the first set of tags is shown as tags 311.

At 204, the method 200 can include determining a second dataset including a second set of features and the first set of tags. In the second dataset, each feature of the second set of features can include one or more feature values associated therewith representative of an attribute of the data. Accordingly, the second dataset can include a plurality of data points that corresponds to, for example, a set of data objects, and each data object can include a set of feature values associated therewith from across the second set of features.

The second dataset can be transformed from the first dataset so that a value of each feature value in the second dataset is based on a value of a corresponding feature value in the first dataset. That is, in the second dataset, the first set of features of the first dataset is transformed into the second set of features in the second dataset, and each of the one or more feature values associated with each feature of the first set of features is transformed into a corresponding one of the one or more feature values associated with each feature of the second set of features based on the respective value in the first dataset, as discussed above with respect to driver module 120 in FIG. 1.

Each feature value in the second dataset can include a binary value. In addition, in some embodiments, the second dataset can include a plurality of data points corresponding to the second set of features, each feature of the second set of features including one or more feature values associated therewith. In some embodiments, each feature value of the first dataset can include a binary value based on the corresponding feature value in the first dataset. In FIG. 3, the second dataset is shown as dataset 312, and the dataset 312 is shown including the second set of features shown as features 314a, 314b, through 314n, and the first set of tags shown as tags 311.

According to some embodiments, determining the second dataset can further include extracting the first set of tags from the first dataset. In some embodiments, determining the second dataset can further include associating the first set of tags extracted from the first dataset with the second dataset and the second set of features. In this regard, At 206, the method 200 can include predicting a third dataset including a third set of features and a second set of tags based on the second dataset. In some embodiments, a machine learning model can predict the third dataset based on applying the second dataset to the machine learning model, as discussed above with respect to ML module 122. In FIG. 3, the machine learning model is shown as model 302, the third dataset is shown as dataset 316, the dataset 316 including the first set of features shown as features 318a, 318b, through 318n, and the second set of tags shown as tags 319.

At 208, the method 200 can include comparing the third dataset to the second dataset to determine a correlation between the third dataset and the second dataset. Comparing the third dataset to the second dataset can include, for example, comparing tags, comparing features, determining a correlation score, determining contributions of features in the outcome prediction of the machine learning model, associating values with features, comparing features based on the values, and ranking the features of datasets, as discussed above with respect to compare module 124 and filter module 126. In FIG. 3, the comparison between the third dataset and the second dataset is shown at block 320.

At 210, the method 200 can include, based on the comparison, filtering at least one feature having one or more missing feature values from the first set of features of the first dataset. Filtering the at least one feature can include ranking features based on the determined contribution and identifying non-informative features having a highest positive impact based on the ranking. In some embodiments, the at least one feature can correspond to high-impact, non-informative feature having a positive impact on the prediction by the machine learning model. In FIG. 3, the filtered at least one feature is shown as feature 318*a* of dataset 316, which corresponds to feature 310*a* at dataset 308.

At 212, the method 200 can include determining a training dataset corresponding to a remaining features of the first set of features of the first dataset. Each feature of the remaining features of the training dataset can further include feature values corresponding to the feature values of the corresponding features of the first dataset, as discussed with regards to filter module 126 in FIG. 1. The training dataset can further include the first set of tags of the first dataset. In FIG. 3, the training dataset is shown as dataset 324, the dataset 324 including a remaining features shown as features 310*b* through 310*n* and the first set of tags shown as tags 311.

By filtering the at least one feature having one or more missing feature values from the first dataset, the non-informative features with a high impact in the outcome prediction by the machine learning model can be filtered from the first dataset and the remaining features can be utilized in the training dataset. The machine learning model can be trained using the training dataset to improve the classification accuracy of the machine learning model. In addition, one or more other machine learning models can be trained using the training dataset to improve the classification accuracy of the one or more other machine learning models. These one or more other machine learning models can be located, for example, across a variety of domains and the models can be trained using the training dataset to improve the accuracy of outcome predictions by the models and to mitigate biased outcome predictions by removing the features from the training dataset that have missing feature values (e.g., null values) that have an impact on the outcome prediction from the models due to the model learn patterns from these former features that may not be relevant to predicting the desired outcome of interest.

In some embodiments, the method 200 can further include training the machine learning model using the second set of features of the second dataset. The machine learning model can be trained using the second set of features of the second dataset to predict the third dataset including the second set of tags, as discussed above with regards to ML module 122 in FIG. 1. The trained machine learning model can be configured to predict the third set of features and the second set of tags of the third dataset based on the second set of features of the second dataset. In some embodiments, the machine learning model can be trained using the second set of features of the second dataset and the machine learning model can output the third dataset including the second set of tags corresponding to a prediction of the first set of tags of the second dataset (or the first dataset).

In addition, in some embodiments, the method 200 can further include training the machine learning model using the training dataset. In some embodiments, the machine learning model can be trained using the second dataset to predict the third dataset and then the machine learning model can be trained using the training dataset (e.g., training dataset) to improve the accuracy of the outcome prediction and to mitigate bias in the model by removing the high-impact, non-informative features. In some embodiments, a first machine learning model can be trained using the second dataset to predict the third dataset and a second machine model can be trained using the training dataset to improve the accuracy of the outcome prediction at the corresponding domain of the second machine learning model and to mitigate bias in the second machine learning model by removing the high-impact, non-informative features. In some embodiments, the trained machine learning model can be configured to be utilized across one or more domains of a system such as, for example, system 100 in FIG. 1.

FIG. 4 is a flow diagram of an example method 400 for transforming datasets, according to some embodiments. The method 400 can be an embodiment of operation 204 of the method 200 in FIG. 2. The method 400, or one or more portions of the method 400, may be performed by FD detection system 102 in conjunction with the data processing system 106, and thus may be computer-implemented.

Figure 5:
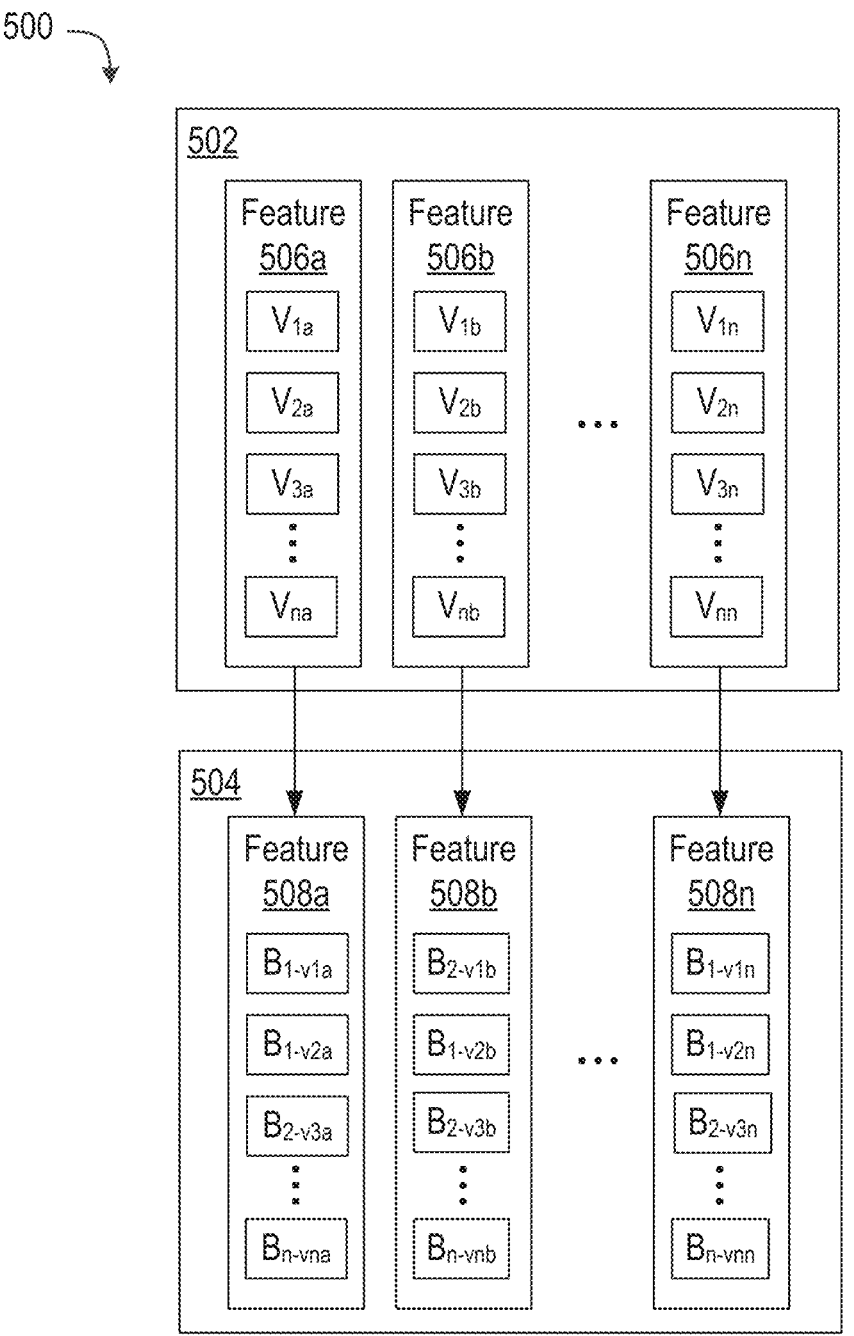
FIG. 5 is a block diagram of an example system for performing the method in FIG. 4, according to some embodiments.

FIG. 5 is a block diagram of an example system 500 for performing the method 400 in FIG. 4, according to some embodiments. The method 400 will be described in conjunction with the system 500.

At 402, the method 400 can include associating a first value with each feature of the second set of features of the second dataset based on a respective value of each feature of the first set of features of the first dataset corresponding to a null value. In some embodiments, determining the second dataset can include associating the first value with one or more feature values of the features of the second dataset based on a respective value of the features of the first dataset corresponding to a null value. That is, for each null value in the first dataset, the second dataset includes a corresponding first value. In FIG. 5, the first dataset is shown as dataset 502 and the second dataset is shown as dataset 504, the first set of features of the first dataset is shown as features 506*a*, 506*b*, through 506*n*, and the second set of features of the second dataset is shown as features 508*a*, 508*b*, through 508*n*, and each of the features 506*a*, 506*b*, through 506*n* of dataset 502 and each of the features 508*a*, 508*b*, through 508*n* of dataset 504 can include a respective one or more feature values. In dataset 502, feature 506*a* is shown including feature values via, $v_{2a}$, $v_{3a}$, through $v_{na}$, feature 506*b* is shown including $v_{1b}$, $v_{2b}$, $v_{3b}$, through $v_{nb}$, and feature 506*n* is shown including $v_{1n}$, $v_{2n}$, $v_{3n}$, through $v_{nn}$. In addition, in FIG. 5, feature 508*a* is shown including $B_{1\text{-}v1a}$, $B_{1\text{-}v2a}$, $B_{1\text{-}v3a}$, through $B_{n\text{-}vna}$, feature 508*b* is shown including $B_{2\text{-}v1b}$, $B_{1\text{-}v2b}$, $B_{2\text{-}3b}$, through $B_{n\text{-}vnb}$, and feature 508*a* is shown including $B_{1\text{-}v1n}$, $B_{1\text{-}v2n}$, $B_{1\text{-}3vn}$, through $B_{1\text{-}vmn}$. Furthermore, in FIG. 5, the feature values in dataset 504 having the first value associated therewith is shown including $B_1$, which corresponds to the features values of dataset 502 that are null values. (Feature 508*a* is shown including first values $B_{1\text{-}v1a}$ and $B_{1\text{-}v2a}$ in FIG. 5).

At 404, the method 400 can include associating the second value with each feature of the second set of features of the second dataset based on a respective value of each feature of the first set of features of the first dataset corresponding to a non-null value. In some embodiments, determining the second dataset can include associating the second value with each feature of the second set of features of the second dataset based on a respective value of each feature of the first set of features of the first dataset corresponding to a non-null value. In FIG. 5, the feature values in dataset 504 having the second value associated therewith is shown including $B_2$, which corresponds to the features values of dataset 502 that are non-null values. (Feature 508a is shown including first values $B_{2-v3a}$ in FIG. 5).

According to some embodiments, the binary values can include the first value and the second value. In some embodiments, the first value can have a value of 0 and the second value can have a value of 1. However, it is to be appreciated that the values of the binary pair are not intended to be limiting and can be represented by any value pair combinations.

FIG. 6 is a flow diagram of an example method 600 for comparing datasets to identify non-informative features, according to some embodiments. The method 600 can be an embodiment of operations 206, 208, 210, 212 of the method 200 of FIG. 2. The method 600, or one or more portions of the method 600, can be performed by the FD detection system 102 in conjunction with the data processing system 106, and thus may be computer-implemented.

Figure 7:
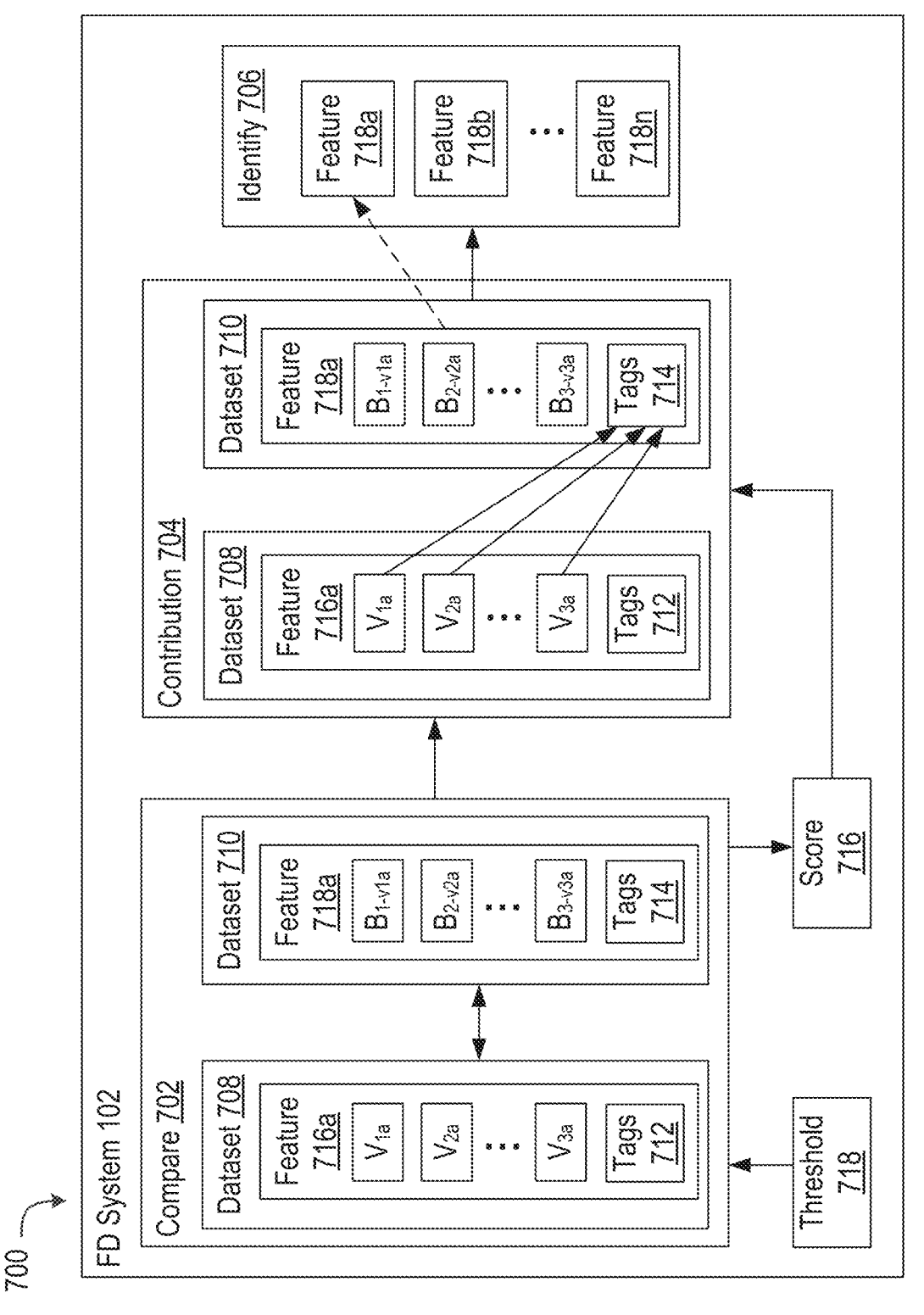
FIG. 7 is a block diagram of an example of a system for performing the method in FIG. 6, according to some embodiments.

FIG. 7 is a block diagram of an example system 700 for performing the method 600 in FIG. 6, according to some embodiments. The method 600 will be described in conjunction with the system 700.

At 602, the method 600 can include comparing the first set of tags of the second dataset to the second set of tags of the third dataset. The tags can describe an attribute or a characteristic of data, thereby providing context to the features of the dataset. The data tags can be utilized by the machine learning model to facilitate predicting the outcome based on the input dataset.

The second dataset includes a second set of features and the first set of tags. The first set of tags can be the original set of tags extracted from the first dataset, and the machine learning model can predict the outcome corresponding to the third dataset including the second set of tags based on the second dataset, as discussed with regards to driver module 120 and ML module 122 in FIG. 1. In some embodiments, comparing the third dataset to the second dataset can include comparing the first set of tags of the second dataset to the second set of tags of the third dataset using one or more statistical methods to determine a correlation between the datasets. In other embodiments, comparing the third dataset to the second dataset can further include determine the correlation between the first set of tags of the second dataset and the second set of tags of the third dataset based on the second set of features of the second dataset and the third set of features of the third dataset. In FIG. 7, the second dataset is shown as dataset 708, the dataset 708 can include a second set of features (feature 716a is shown) and a first set of tags shown as tags 712. In addition, the third dataset is shown as dataset 710, the dataset 710 can include a third set of features (feature 718a is shown) and a second set of tags shown as tags 714.

At 604, the method 600 can include determining a correlation score representative of a similarity between the first set of tags and the second set of tags. The score can be representative of the relationship between the first set of tags of the second dataset and the second set of tag of the third dataset. In some embodiments, the correlation score can be determined based on the relationship between each tag of the first set of tags of the second dataset and each respective tag of the second set of tags of the third dataset. The correlation score, or scores, can then be compared to a threshold value. The correlation score exceeding the threshold value can be indicative of the model being trained on features suspected of being high-impact, non-informative features based on the machine learning model being able to predict the first set of tags (e.g., original tags). In some embodiments, determining the correlation score can include calculating a correlation coefficient, as discussed with regards to compare module 124. In FIG. 7, the comparing of datasets is shown at compare 702, the correlation score is shown at score 716, the threshold value is shown at threshold 718.

At 606, the method 600 can include determining a contribution of each feature of the second set of features in response to the score exceeding a threshold. That is, the correlation score exceeding the threshold value can be indicative of the model being trained on features suspected of being high-impact, non-informative features, and each features contribution to the final outcome prediction of the model can be determined to identify the suspected features, as discussed with regards to filter module 126. In some embodiments, the contribution of each feature of the second set of features in predicting the third dataset including the second set of tags can be determined. In other embodiments, the contribution of each feature of the second set of features in predicting the third dataset including the second set of tags can be based on the third set of features. In FIG. 7, the contribution of the features (features 716a is shown) is shown at contribution 704.

At 608, the method 600 can include identifying the at least one feature having the one or more missing feature values based on the determined contribution. The at least one feature can correspond to at least one non-informative feature having a positive impact on the prediction by the machine learning model. In some embodiments, the at least one feature can correspond to at least one non-informative feature having a highest positive impact on the prediction by the machine learning model. The feature having a positive impact can refer to the feature affecting the prediction outcome of the machine learning model, whereas the feature having a negative impact can refers to the feature not affecting the prediction outcome of the machine learning model or the feature's affect on the prediction outcome being below a certain threshold limit. In some embodiments, the at least one feature can be of the third set of features. In FIG. 7, the at least one feature is shown as feature 718a of the third set of features 718a, 718b, through 718n of dataset 710. In other embodiments, the at least one feature can be of the second dataset such as, for example, feature 716a of FIG. 7. In some embodiments, the at least one feature can be of the first dataset such as, for example, at least one of the features 310a, 310b, through 310n of dataset 308 in FIG. 3.

Figure 8:
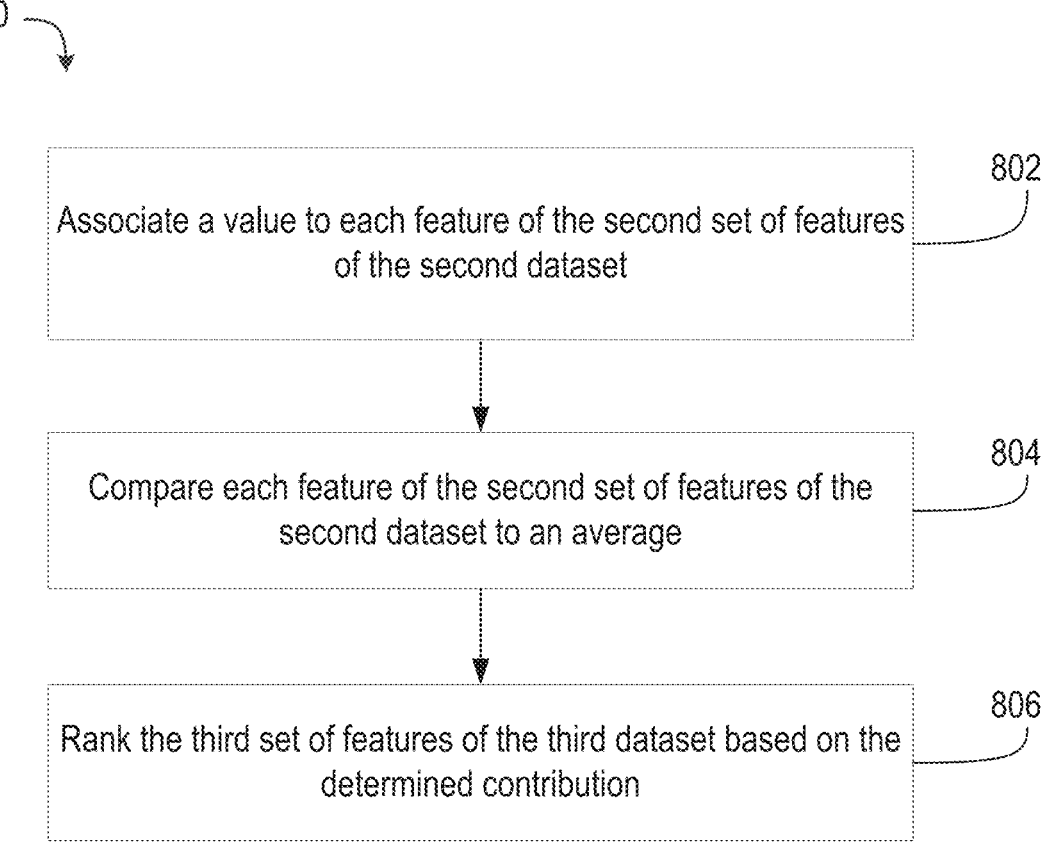
FIG. 8 is a flow diagram of an example of a method for determining the contribution of features, according to some embodiments.

FIG. 8 is a flow diagram of an example method 800 for determining the contribution of features, according to some embodiments. The method 800 can be an embodiment of operations 208, 210, 212 of the method 200 of FIG. 2 or operations 602, 604, 606, 608 in FIG. 6. The method 800, or one or more portions of the method 800, can be performed by the FD detection system 102 in conjunction with the data processing system 106, and thus may be computer-implemented.

Figure 9:
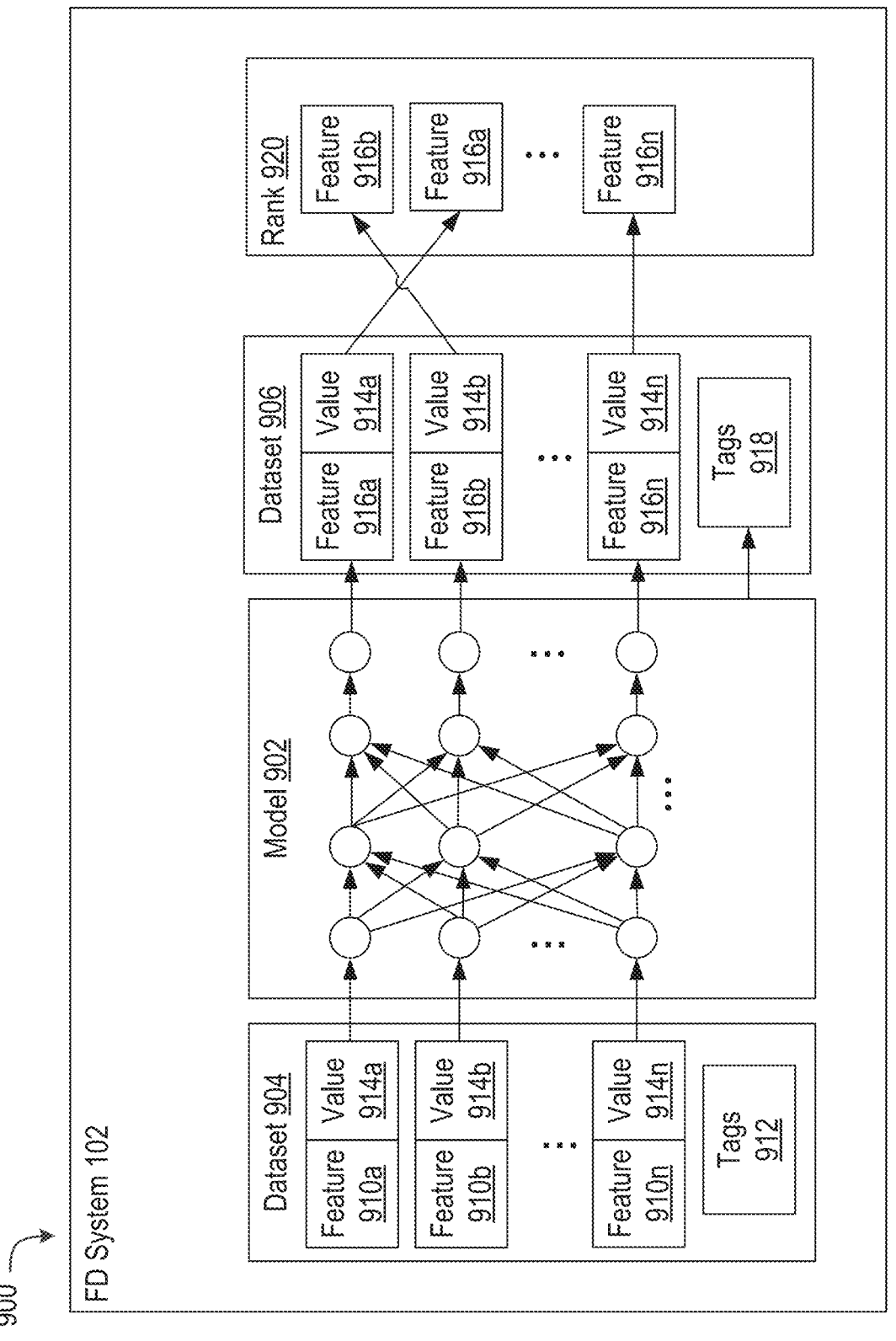
FIG. 9 is a block diagram of an example of a system for performing the method in FIG. 6, according to some embodiments.

FIG. 9 is a block diagram of an example system 900 for performing the method 600 in FIG. 6, according to some embodiments. The method 800 will be described in conjunction with the system 900.

At 802, the method 800 can include associating a value to each feature of the second set of features of the second dataset. In some embodiments, the value associated with each feature can be a unique value, as discussed above with regards to filter module 126. In some embodiments, the unique value can be associated with each feature of the model. In this regard, as the model trains on the second set of features and outputs the prediction (e.g., third dataset), the unique value associated with each feature in the model can be used to determine the contribution of each feature in the outcome prediction by the model. In FIG. 9, the model is shown as model 902, the second dataset is shown as dataset 904, the second set of features is shown as features 910*a*, 910*b*, through 910*n*, and the respective values associated with features 910*a*, 910*b*, through 910*n* is shown as values 914*a*, 914*b*, through 914*n*.

At 804, the method 800 can include comparing each feature of the second set of features of the second dataset to an average to determine an impact each feature of the second set of features of the second dataset has in affecting the prediction of the third dataset by the machine learning model. Each feature can be compared to an average to determine the impact each feature has in affecting the outcome prediction, to determine the significance of each feature in the model compared to other features in the dataset, and to determine how the model relies on interactions between the features in outputting the prediction.

At 806, the method 800 can include ranking the third set of features of the third dataset based on the determined contribution. The at least one feature having the one or more missing values can be identified based on the ranking of the third set of features. In this regard, based on their respective contributions in predicting the second set of features of the third dataset, each of the features can be ranked according to the level of contribution in the outcome prediction at the model. In some embodiments, each of the features can be ranked based on their contribution in the machine learning model predicting the second set of tags based on the reliance of the machine learning model on the absence or existence of values in the second dataset that correspond to the null values in the first dataset. In some embodiments, the ranking can be performed on the first set of features based on determining the contribution of each feature of the second set of features in the machine learning model determining the third dataset. In other embodiments, the ranking can be performed on at least one of the first set of features, the second set of features, or the third set of features based on determining the contribution of each feature of the second set of features in the machine learning model determining the third dataset. In FIG. 9, the ranking of the features is shown at rank 920 (the ranking of features 916*a*, 916*b*, through 916*n* of dataset 906 is shown in FIG. 9).

Figure 10:
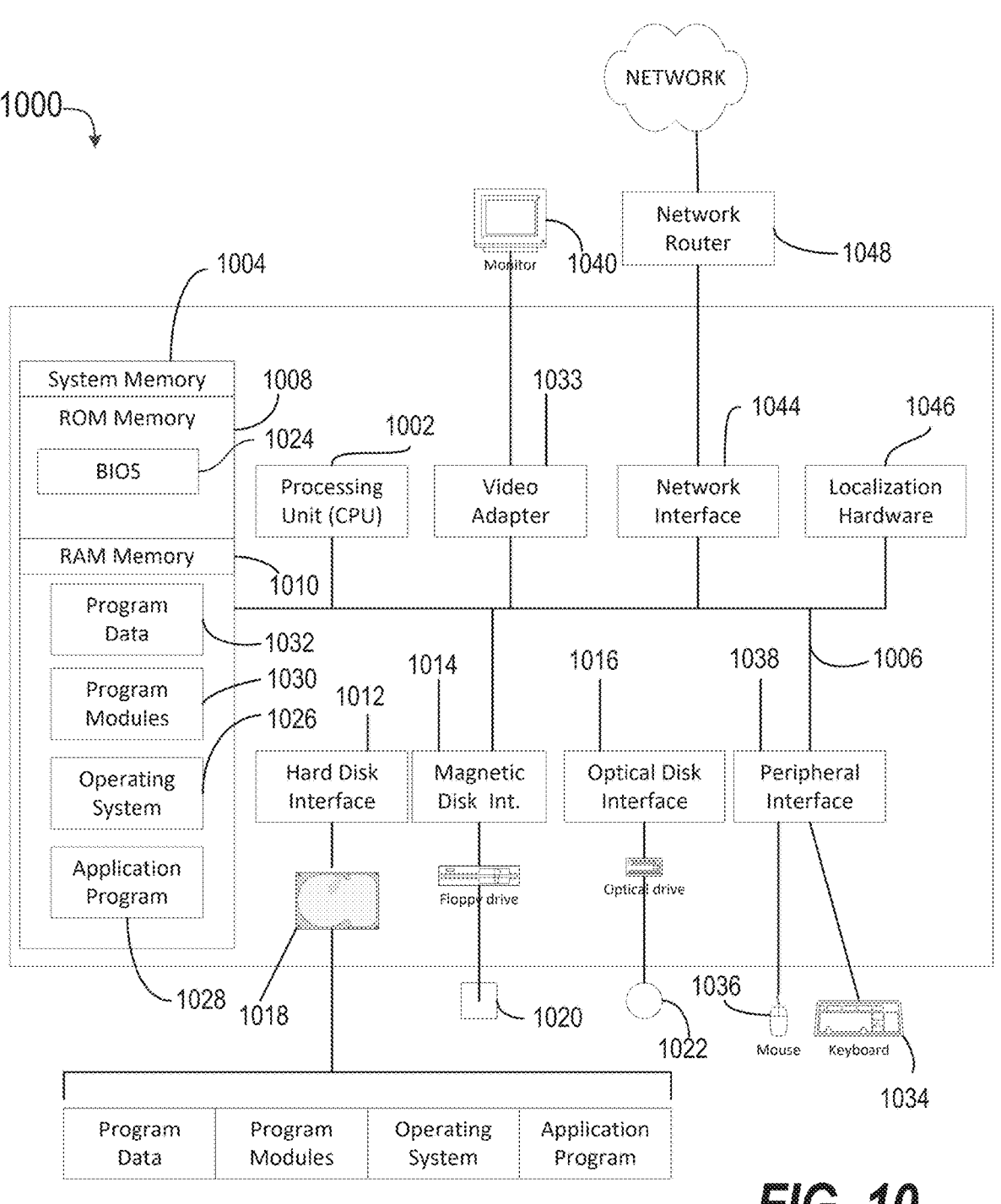
FIG. 10 is a block diagram of an example of a computing environment, according to some embodiments.

FIG. 10 is a block diagram of an example computing environment 1000, such as a desktop computer, laptop, smartphone, tablet, or any other such device having the ability to execute instructions, such as those stored within a non-transient, computer-readable medium, according to some embodiments.

Furthermore, while described and illustrated in the context of a single computing system 1000, those skilled in the art will also appreciate that the various tasks described hereinafter may be practiced in a distributed environment having multiple computing systems 1000 linked via a local or wide-area network in which the executable instructions may be associated with and/or executed by one or more of multiple computing systems 1000.

In its most basic configuration, computing system environment 1000 typically includes at least one processing unit 1002 and at least one memory 1004, which may be linked via a bus 1006. Depending on the exact configuration and type of computing system environment, memory 1004 may be volatile (such as RAM 1010), non-volatile (such as ROM 1008, flash memory, etc.) or some combination of the two. Computing system environment 1000 may have additional features and/or functionality. For example, computing system environment 1000 may also include additional storage (removable and/or non-removable) including, but not limited to, magnetic or optical disks, tape drives and/or flash drives. Such additional memory devices may be made accessible to the computing system environment 1000 by means of, for example, a hard disk drive interface 1012, a magnetic disk drive interface 1014, and/or an optical disk drive interface 1016. As will be understood, these devices, which would be linked to the system bus 1006, respectively, allow for reading from and writing to a hard disk 1018, reading from or writing to a removable magnetic disk 1020, and/or for reading from or writing to a removable optical disk 1022, such as a CD/DVD ROM or other optical media. The drive interfaces and their associated computer-readable media allow for the nonvolatile storage of computer readable instructions, data structures, program modules and other data for the computing system environment 1000. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1000.

A number of program modules may be stored in one or more of the memory/media devices. For example, a basic input/output system (BIOS) 1024, containing the basic routines that help to transfer information between elements within the computing system environment 1000, such as during start-up, may be stored in ROM 1008. Similarly, RAM 1010, hard drive 1018, and/or peripheral memory devices may be used to store computer executable instructions comprising an operating system 1026, one or more applications programs 1028, other program modules 1030, and/or program data 1032. Still further, computer-executable instructions may be downloaded to the computing environment 1000 as needed, for example, via a network connection. The applications programs 1028 may include, for example, a browser, including a particular browser application and version, which browser application and version may be relevant to determinations of correspondence between communications and user URL requests, as described herein. Similarly, the operating system 1026 and its version may be relevant to determinations of correspondence between communications and user URL requests, as described herein.

An end-user may enter commands and information into the computing system environment 1000 through input devices such as a keyboard 1034 and/or a pointing device 1036. While not illustrated, other input devices may include a microphone, a joystick, a game pad, a scanner, etc. These and other input devices would typically be connected to the processing unit 1002 by means of a peripheral interface 1038 which, in turn, would be coupled to bus 1006. Input devices may be directly or indirectly connected to processor 1002 via interfaces such as, for example, a parallel port, game port, firewire, or a universal serial bus (USB). To view information from the computing system environment 1000, a monitor 1040 or other type of display device may also be connected to bus 1006 via an interface, such as via video adapter 1033. In addition to the monitor 1040, the computing system environment 1000 may also include other peripheral output devices, not shown, such as speakers and printers.

The computing system environment 1000 may also utilize logical connections to one or more computing system environments. Communications between the computing system environment 1000 and the remote computing system environment may be exchanged via a further processing device, such as network router 1048, that is responsible for network routing. Communications with the network router 1048 may be performed via a network interface component 1044. Thus, within such a networked environment, e.g., the Internet, World Wide Web, LAN, or other like type of wired or wireless network, it will be appreciated that program modules depicted relative to the computing system environment 1000, or portions thereof, may be stored in the memory storage device(s) of the computing system environment 1000.

The computing system environment 1000 may also include localization hardware 1046 for determining a location of the computing system environment 1000. In embodiments, the localization hardware 1046 may include, for example only, a GPS antenna, an RFID chip or reader, a WiFi antenna, or other computing hardware that may be used to capture or transmit signals that may be used to determine the location of the computing system environment 1000. Data from the localization hardware 1046 may be included in a callback request or other user computing device metadata in the methods of this disclosure.

The computing system, or one or more portions thereof, may embody a user computing device 108, in some embodiments. Additionally, or alternatively, some components of the computing system 1000 may embody the FD detection system 102 and/or data processing system 106. For example, the functional modules 120, 122, 124, 126 may be embodied as program modules 1030.

In some embodiments, a computer-implemented method includes obtaining a first dataset including a first set of features and a first set of tags; determining a second dataset including a second set of features and the first set of tags, wherein the first set of features being transformed into the second set of features, and wherein each of the second set of features of the second dataset includes a binary value; predicting, by a machine learning model, a third dataset including a third set of features and a second set of tags based on the second dataset; comparing the third dataset to the second dataset to determine a correlation between the third dataset and the second dataset; based on the comparison, filtering at least one feature having one or more missing feature values from the first set of features of the first dataset; and determining a training dataset corresponding to a remaining features of the first set of features of the first dataset, wherein the machine learning model being trained using the training dataset improves an outcome prediction accuracy of the machine learning model.

In some embodiments, the computer-implemented method further includes extracting the first set of tags from the first dataset; and associating the first set of tags with the second dataset.

In some embodiments, determining the second dataset including the second set of features and the first set of tags further includes associating a first value with each feature of the second set of features of the second dataset based on a respective value of each feature of the first set of features of the first dataset corresponding to a null value; and associating a second value with each feature of the second set of features of the second dataset based on the respective value of each feature of the first set of features of the first dataset corresponding to a non-null value.

In some embodiments, the first value is a value of 0 and the second value is a value of 1.

In some embodiments, comparing the third dataset to the second dataset further includes comparing the first set of tags of the second dataset to the second set of tags of the third dataset; determining a score representative of a similarity between the first set of tags and the second set of tags; determining a contribution of each feature of the third set of features in response to the score exceeding a threshold; and identifying the at least one feature having the one or more missing feature values based on the determined contribution.

In some embodiments, determining the contribution of each feature of the third set of features further includes associating a value to each feature of the second set of features of the second dataset; comparing each feature of the second set of features of the second dataset to an average to determine an impact each feature of the second set of features of the second dataset has in the prediction of the third dataset by the machine learning model; and ranking the third set of features of the third dataset based on the determined contribution, wherein the at least one feature having the one or more missing feature values being identified based on the ranking of the third set of features.

In some embodiments, the computer-implemented method further includes training the machine learning model using the second set of features of the second dataset, the machine learning model being configured to predict the third set of features and the second set of tags of the third dataset based on the second set of features of the second dataset; and training the machine learning model using the training dataset.

In some embodiments, the trained machine learning model being configured to be utilized across one or more domains.

In some embodiments, the at least one feature having the one or more missing feature values corresponding to a non-informative feature having a positive impact on the prediction by the machine learning model.

In some embodiments, a system includes a processor; and a non-transitory computer readable media having stored thereon instructions that are executable by the system to cause the processor to perform one or more operations including obtain a first dataset including a first set of features and a first set of tags; extract the first set of tags from the first dataset; determine a second dataset including a second set of features, wherein the first set of features being transformed into the second set of features, and wherein each of the second set of features of the second dataset includes a binary value; associate the first set of tags with the second dataset; predict, by a machine learning model, a third dataset including a third set of features and a second set of tags based on the second dataset; compare the third dataset to the second dataset to determine a correlation between the third dataset and the second dataset; based on the comparison, filter at least one feature having one or more missing feature values from the first set of features of the first dataset; and determine a training dataset corresponding to a remaining features of the first set of features of the first dataset, wherein the machine learning model being trained using the training dataset improves an outcome prediction accuracy of the machine learning model.

In some embodiments, determining the second dataset including the second set of features and the first set of tags further includes associating a first value with each feature of the second set of features of the second dataset based on a respective value of each feature of the first set of features of the first dataset corresponding to a null value; and associating a second value with each feature of the second set of features of the second dataset based on the respective value of each feature of the first set of features of the first dataset corresponding to a non-null value.

In some embodiments, the first value is a value of 0 and the second value is a value of 1.

In some embodiments, comparing the third dataset to the second dataset further includes comparing the first set of tags of the second dataset to the second set of tags of the third dataset; determining a score representative of a similarity between the first set of tags and the second set of tags; determining a contribution of each feature of the third set of features in response to the score exceeding a threshold; and identifying the at least one feature having the one or more missing feature values based on the determined contribution.

In some embodiments, determining the contribution of each feature of the third set of features further includes associating a value to each feature of the second set of features of the second dataset; comparing each feature of the second set of features of the second dataset to an average to determine an impact each feature of the second set of features of the second dataset has in affecting the prediction of the third dataset by the machine learning model; and ranking the third set of features of the third dataset based on the determined contribution, wherein the at least one feature being identified based on the ranking of the third set of features.

In some embodiments, the operations further includes training the machine learning model using the second set of features of the second dataset; and training the machine learning model using the training dataset, wherein the machine learning model being configured to predict the third set of features and the second set of tags of the third dataset based on the second set of features of the second dataset, and wherein the trained machine learning model being configured to be utilized across one or more domains.

In some embodiments, the at least one feature having the one or more missing feature values corresponding to a non-informative feature having a positive impact on the prediction by the machine learning model.

In some embodiments, a computer-program product corresponding to instructions that are executable by a computing system to cause a processor to perform operations including obtain a first dataset including a first set of features and a first set of tags; determine a second dataset including a second set of features and the first set of tags, wherein the first set of features being transformed into the second set of features, and wherein each of the second set of features of the second dataset includes a binary value, the determining of the second dataset including: associate a first value with each feature of the second set of features of the second dataset based on a respective value of each feature of the first set of features of the first dataset corresponding to a null value, associate a second value with each feature of the second set of features of the second dataset based on the respective value of each feature of the first set of features of the first dataset corresponding to a non-null value, extract the first set of tags from the first dataset, and associate the first set of tags with the second dataset; train a machine learning model using the second set of features of the second dataset; predict, by the machine learning model, a third dataset including a third set of features and a second set of tags based on the second dataset; compare the third dataset to the second dataset to determine a correlation therebetween; based on the comparison, filter at least one feature having one or more missing values from the first set of features of the first dataset; determine a training dataset corresponding to a remaining features of the first set of features of the first dataset; and training the machine learning model using the training dataset, wherein the machine learning model being trained using the training dataset improves an outcome prediction accuracy of the machine learning model.

In some embodiments, the first value is a value of 0 and the second value is a value of 1.

In some embodiments, comparing the third dataset to the second dataset further includes comparing the first set of tags of the second dataset to the second set of tags of the third dataset; determining a score representative of a similarity between the first set of tags and the second set of tags; determining a contribution of each feature of the third set of features in response to the score exceeding a threshold; and identifying the at least one feature based on the determined contribution.

In some embodiments, determining the contribution of each feature of the third set of features further includes associating a value to each feature of the second set of features of the second dataset; comparing each feature of the second set of features of the second dataset to an average to determine an impact each feature of the second set of features of the second dataset has in affecting the prediction of the third dataset by the machine learning model; and ranking the third set of features of the third dataset based on the determined contribution, wherein the at least one feature having the one or more missing values being identified based on the ranking of the third set of features, wherein the at least one feature corresponding to a non-informative feature having a positive impact on the prediction by the machine learning model.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method comprising:
obtaining a first dataset including a first set of features and a first set of tags;
determining a second dataset including a second set of features and the first set of tags, wherein the second set of features being transformed from the first set of features, and wherein each of the second set of features of the second dataset comprises a binary value;
predicting, by a machine learning model, a third dataset including a third set of features and a second set of tags based on the second dataset;
comparing the third dataset to the second dataset to determine a correlation between the third dataset and the second dataset, the correlation being determined based on a contribution of each feature of the third set of features according to a score representative of a similarity between the first set of tags of the second dataset and the second set of tags of the third dataset relative to a threshold;
based on the comparison, filtering at least one feature having one or more missing feature values from the first set of features of the first dataset; and
determining a training dataset corresponding to a remaining features of the first set of features of the first dataset, wherein the machine learning model being trained using the training dataset enables improved classification accuracy by the machine learning model.

2. The computer-implemented method of claim 1, further comprising:
extracting the first set of tags from the first dataset; and
associating the first set of tags with the second dataset.

3. The computer-implemented method of claim 1, wherein determining the second dataset including the second set of features and the first set of tags further comprises:
associating a first value with each feature of the second set of features of the second dataset based on a respective value of each feature of the first set of features of the first dataset corresponding to a null value; and
associating a second value with each feature of the second set of features of the second dataset based on a respective value of each feature of the first set of features of the first dataset corresponding to a non-null value.

4. The computer-implemented method of claim 3, wherein the first value is a value of 0 and the second value is a value of 1.

5. The computer-implemented method of claim 1, wherein comparing the third dataset to the second dataset further comprises:
comparing the first set of tags of the second dataset to the second set of tags of the third dataset;
determining the score representative of the similarity between the first set of tags and the second set of tags;
determining the contribution of each feature of the third set of features in response to the score exceeding the threshold; and
identifying the at least one feature having the one or more missing feature values based on the determined contribution.

6. The computer-implemented method of claim 5, wherein determining the contribution of each feature of the third set of features further comprises:
associating a value to each feature of the second set of features of the second dataset;
comparing each feature of the second set of features of the second dataset to an average to determine an impact each feature of the second set of features of the second dataset has in the prediction of the third dataset by the machine learning model; and
ranking the third set of features of the third dataset based on the determined contribution,
wherein the at least one feature having the one or more missing feature values is identified based on the ranking of the third set of features.

7. The computer-implemented method of claim 1, further comprising:
training the machine learning model using the second set of features of the second dataset, the machine learning model being configured to predict the third set of features and the second set of tags of the third dataset based on the second set of features of the second dataset; and
training the machine learning model using the training dataset.

8. The computer-implemented method of claim 7, wherein the trained machine learning model is configured to be utilized across one or more architecture domains.

9. The computer-implemented method of claim 1, wherein the at least one feature having the one or more missing feature values corresponds to a non-informative feature having a positive impact on the prediction by the machine learning model.

10. A system comprising:

a processor; and a non-transitory computer readable media having stored thereon instructions that are executable by the system to cause the processor to perform one or more operations comprising:

obtain a first dataset including a first set of features and a first set of tags;

extract the first set of tags from the first dataset;

determine a second dataset including a second set of features, wherein the second set of features is transformed from the first set of features, and wherein each of the second set of features of the second dataset comprises a binary value;

associate the first set of tags with the second dataset;

predict, by a machine learning model, a third dataset including a third set of features and a second set of tags based on the second dataset;

compare the third dataset to the second dataset to determine a correlation between the third dataset and the second dataset;

based on the comparison, filter at least one feature having one or more missing feature values from the first set of features of the first dataset; and determine a training dataset corresponding to a remaining features of the first set of features of the first dataset, wherein the machine learning model being trained using the training dataset enables improved classification accuracy by the machine learning model, wherein comparing the third dataset to the second dataset to determine the correlation between the third dataset and the second dataset comprises:

determining a contribution of each feature of the third set of features in response to a score representative of a similarity between the first set of tags of the second dataset and the second set of tags of the third dataset exceeding a threshold; and wherein the at least one feature having the one or more missing feature values being identified based on the determined contribution.

11. The system of claim 10, wherein determining the second dataset including the second set of features and the first set of tags further comprises:

associating a first value with each feature of the second set of features of the second dataset based on a respective value of each feature of the first set of features of the first dataset corresponding to a null value; and associating a second value with each feature of the second set of features of the second dataset based on the respective value of each feature of the first set of features of the first dataset corresponding to a non-null value.

12. The system of claim 11, wherein the first value is a value of 0 and the second value is a value of 1.

13. The system of claim 10, wherein comparing the third dataset to the second dataset further comprises:

comparing the first set of tags of the second dataset to the second set of tags of the third dataset; and determining the score representative of the similarity between the first set of tags and the second set of tags; and identifying the at least one feature having the one or more missing feature values based on the determined contribution.

14. The system of claim 13, wherein determining the contribution of each feature of the third set of features further comprises:

associating a value to each feature of the second set of features of the second dataset;

comparing each feature of the second set of features of the second dataset to an average to determine an impact each feature of the second set of features of the second dataset has in affecting the prediction of the third dataset by the machine learning model; and ranking the third set of features of the third dataset based on the determined contribution, wherein the at least one feature is identified based on the ranking of the third set of features.

15. The system of claim 10, further comprising:

training the machine learning model using the second set of features of the second dataset; and training the machine learning model using the training dataset, wherein the machine learning model being configured to predict the third set of features and the second set of tags of the third dataset based on the second set of features of the second dataset, and wherein the trained machine learning model is configured to be utilized across one or more architecture domains.

16. The system of claim 10, wherein the at least one feature having the one or more missing feature values corresponds to a non-informative feature having a positive impact on the prediction by the machine learning model.

17. A computer-program product comprising a non-transitory computer-readable media having stored thereon instructions that are executable by a computing system to cause a processor to perform operations comprising:

obtain a first dataset including a first set of features and a first set of tags;

determine a second dataset including a second set of features and the first set of tags, wherein the second set of features is transformed from the first set of features, and wherein each of the second set of features of the second dataset comprises a binary value, the determining of the second dataset comprising:

associate a first value with each feature of the second set of features of the second dataset based on a respective value of each feature of the first set of features of the first dataset corresponding to a null value, associate a second value with each feature of the second set of features of the second dataset based on the respective value of each feature of the first set of features of the first dataset corresponding to a non-null value, extract the first set of tags from the first dataset, and associate the first set of tags with the second dataset;

train a machine learning model using the second set of features of the second dataset;

predict, by the machine learning model, a third dataset including a third set of features and a second set of tags based on the second dataset;

compare the third dataset to the second dataset to determine a correlation therebetween;

based on the comparison, filter at least one feature having one or more missing values from the first set of features of the first dataset;

determine a training dataset corresponding to a remaining features of the first set of features of the first dataset; and training the machine learning model using the training dataset, wherein the machine learning model being trained using the training dataset enables improved classification accuracy by the machine learning model, wherein comparing the third dataset to the second dataset to determine the correlation therebetween comprises:

determining a score representative of a similarity between the first set of tags and the second set of tags;

determining a contribution of each feature of the third set of features in response to the score exceeding a threshold, wherein the at least one feature is filtered from the first dataset based on the determined contribution.

18. The computer-program product of claim 17, wherein the first value is a value of 0 and the second value is a value of 1.

19. The computer-program product of claim 17, wherein comparing the third dataset to the second dataset further comprises:

comparing the first set of tags of the second dataset to the second set of tags of the third dataset; and identifying the at least one feature based on the determined contribution.

20. The computer-program product of claim 19, wherein determining the contribution of each feature of the third set of features further comprises:

associating a value to each feature of the second set of features of the second dataset;

comparing each feature of the second set of features of the second dataset to an average to determine an impact each feature of the second set of features of the second dataset has in affecting the prediction of the third dataset by the machine learning model; and ranking the third set of features of the third dataset based on the determined contribution, wherein the at least one feature having the one or more missing values is identified based on the ranking of the third set of features, wherein the at least one feature corresponds to a non-informative feature having a positive impact on the prediction by the machine learning model.

* * * * *